US012640065B2

(12) United States Patent
Kajita

(10) Patent No.: US 12,640,065 B2
(45) Date of Patent: May 26, 2026

(54) DISPLAY CONTROL APPARATUS, SYSTEM, AND DISPLAY CONTROL METHOD FOR REALIZING MR EXPERIENCE

(71) Applicant: CANON KABUSHIKI KAISHA, Tokyo (JP)

(72) Inventor: Yoshiki Kajita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/035,028

(22) Filed: Jan. 23, 2025

(65) Prior Publication Data

US 2025/0259575 A1 Aug. 14, 2025

(30) Foreign Application Priority Data

Feb. 13, 2024 (JP) ................................. 2024-019294

(51) Int. Cl.
*G09G 3/00* (2006.01)
*G02B 27/01* (2006.01)
(52) U.S. Cl.
CPC ......... *G09G 3/003* (2013.01); *G02B 27/0172* (2013.01); *G02B 2027/0138* (2013.01); *G02B 2027/014* (2013.01); *G09G 2340/0435* (2013.01); *G09G 2340/12* (2013.01)
(58) Field of Classification Search
CPC ........... G09G 3/003; G09G 2340/0435; G09G 2340/12; G02B 27/0172; G02B 2027/0138; G02B 2027/014
See application file for complete search history.

(56) References Cited

U.S. PATENT DOCUMENTS

| | | | | |
|---|---|---|---|---|
| 7,918,781 B1 * | 4/2011 | Smyth | ................... | A61M 21/00 600/27 |
| 2008/0297437 A1 * | 12/2008 | Takahashi | ............ | G02B 27/017 345/8 |
| 2017/0155885 A1 * | 6/2017 | Selstad | ..................... | G06T 7/20 |
| 2019/0310475 A1 * | 10/2019 | Yamaguchi | ............ | G06F 3/011 |
| 2020/0312033 A1 | 10/2020 | Ohashi | | |

FOREIGN PATENT DOCUMENTS

JP 2015-231106 A 12/2015

* cited by examiner

*Primary Examiner* — Brent D Castiaux
(74) *Attorney, Agent, or Firm* — Venable LLP

(57) ABSTRACT

A display control apparatus acquires a captured image of a real space captured by an imaging apparatus. The display control apparatus acquires a virtual image based on a position and attitude of the imaging apparatus, estimated using a first captured image. The display control apparatus generates a first corrected image by correcting the virtual image, based on a first attitude, which is an attitude of the imaging apparatus at a first time point that is later than an imaging time point of the first captured image. The display control apparatus generates a first composite image by compositing a second captured image having been captured after the first captured image and the first corrected image. The display control apparatus controls a display so as to display the first composite image.

20 Claims, 15 Drawing Sheets

FIG. 5

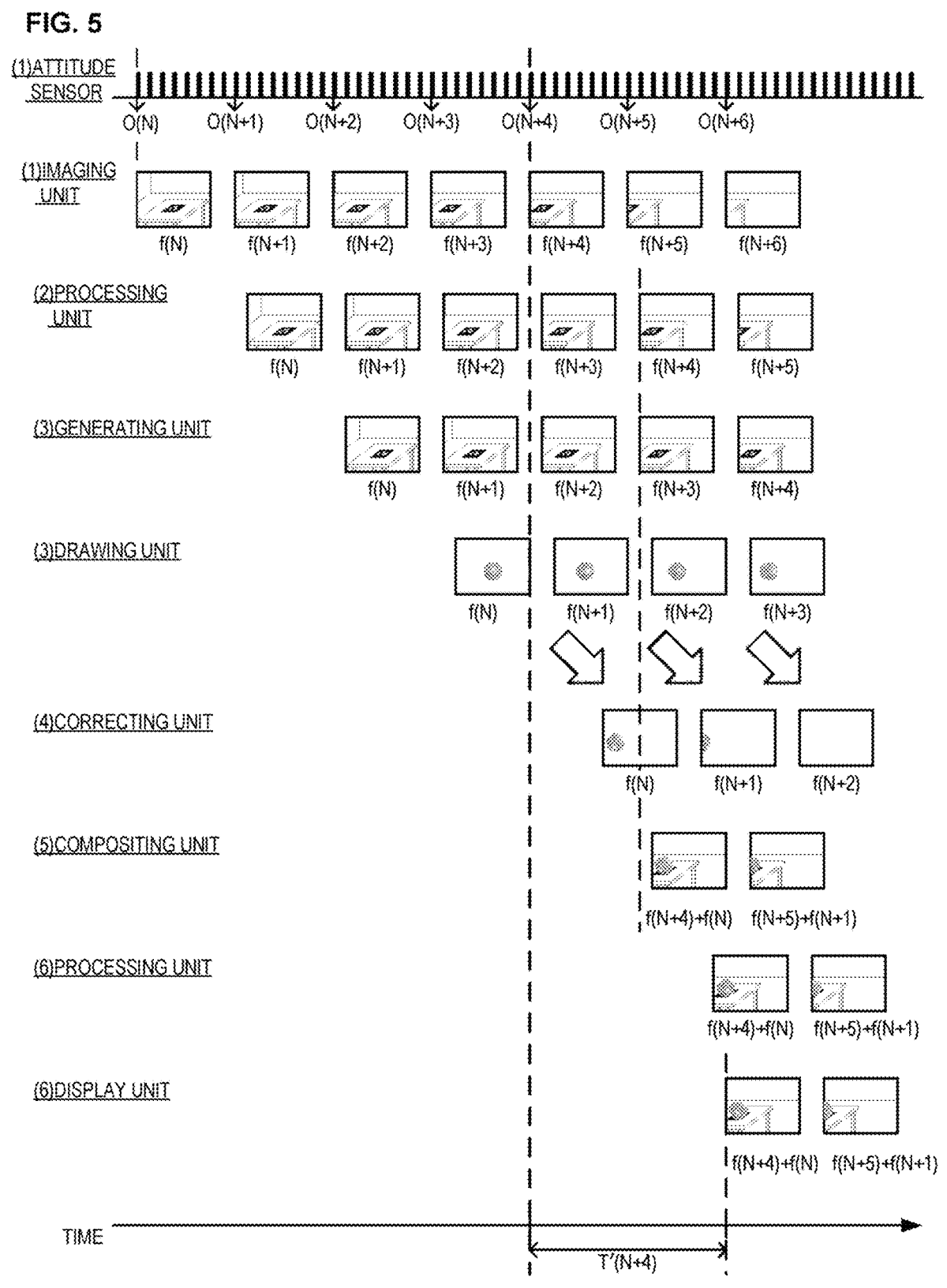

(1)ATTITUDE SENSOR

O(N)     O(N+1)     O(N+2)     O(N+3)     O(N+4)     O(N+5)     O(N+6)

(1)IMAGING UNIT f(N)     f(N+1)     f(N+2)     f(N+3)     f(N+4)     f(N+5)     f(N+6)

(2)PROCESSING UNIT f(N)     f(N+1)     f(N+2)     f(N+3)     f(N+4)     f(N+5)

(3)GENERATING UNIT f(N)     f(N+1)     f(N+2)     f(N+3)     f(N+4)

(3)DRAWING UNIT f(N)     f(N+1)     f(N+2)     f(N+3)

(4)CORRECTING UNIT f(N)     f(N+1)     f(N+2)

(5)COMPOSITING UNIT f(N+4)+f(N)     f(N+5)+f(N+1)

(6)PROCESSING UNIT f(N+4)+f(N)     f(N+5)+f(N+1)

(6)DISPLAY UNIT f(N+4)+f(N)     f(N+5)+f(N+1)

TIME

T'(N+4)

DRAWING UNIT

VIRTUAL IMAGE 1

VIRTUAL IMAGE 2

ATTITUDE SENSOR    ATTITUDE INFORMATION 1    ATTITUDE INFORMATION 2    ATTITUDE INFORMATION 3

CORRECTING UNIT

VIRTUAL CORRECTED IMAGE 1

VIRTUAL CORRECTED IMAGE 1'

VIRTUAL CORRECTED IMAGE 2

IMAGING UNIT

CAPTURED IMAGE 1

CAPTURED IMAGE 2

CAPTURED IMAGE 3

COMPOSITING UNIT

COMPOSITED IMAGE 1

COMPOSITED IMAGE 2

COMPOSITED IMAGE 3

ORIGINAL
VIRTUAL IMAGE

VIRTUAL CORRECTED IMAGE

DISPLAY CONTROL APPARATUS, SYSTEM, AND DISPLAY CONTROL METHOD FOR REALIZING MR EXPERIENCE

BACKGROUND OF THE INVENTION

Field of the Invention

The present invention relates to a display control apparatus, a system, and a display control method for realizing an MR experience.

Description of the Related Art

In recent years, mixed reality technology, or so-called MR technology, is known as technology that merges a real world and a virtual world in real time and in a seamless manner. For example, the MR technology includes an MR system that utilizes a video see-through HMD (Head Mounted Display). In the MR system, an imaging unit built into the HMD captures an image of a subject that approximately matches a subject observed from a pupil position of a user. In addition, the user can experience an MR space by being presented with a composite image in which computer graphics (CG) are superimposed on an image obtained by the imaging.

The MR system calculates a position and attitude of the HMD through arithmetic processing using a captured image, sensor information, and the like. In this case, the imaging unit and each sensor desirably operate in synchronization with each other as much as possible. If the imaging unit and a display unit are to operate asynchronously, the time from imaging to display may vary from frame to frame, or duplicated or missing frames may occur due to differences between imaging cycles and display cycles, which may cause a sense of discomfort to be imparted to the user.

Japanese Patent Application Laid-open No. 2015-231106 describes a technique for correcting a captured image based on line-of-sight information and generating a virtual image based on the corrected captured image. In addition, Japanese Patent Application Laid-open No. 2015-231106 discloses a technique for displaying a composite image in which a captured image and a virtual image are composited.

In Japanese Patent Application Laid-open No. 2015-231106, a captured image is corrected and a virtual image is generated based on a line-of-sight direction of an observer. Accordingly, when compositing the captured image and the virtual image, a compositing position can be controlled more appropriately. However, since no consideration is given to "processing time taken to draw the virtual image itself and the time taken by processing until the virtual image is subsequently displayed on the HMD", the composite image ends up imparting a sense of discomfort to the user. Therefore, the user is unable to have a highly realistic MR experience.

SUMMARY OF THE INVENTION

In consideration thereof, an object of the present invention is to enable a user to have a highly realistic MR experience.

An aspect of the invention is a display control apparatus, including one or more processors and/or circuitry configured to: execute first acquisition processing of acquiring a captured image of a real space captured by an imaging apparatus; execute second acquisition processing of acquiring a virtual image based on a position and attitude of the imaging apparatus, estimated using a first captured image; execute first correction processing of generating a first corrected image by correcting the virtual image, based on a first attitude, which is an attitude of the imaging apparatus at a first time point that is later than an imaging time point of the first captured image; execute composition processing of generating a first composite image by compositing a second captured image having been captured after the first captured image and the first corrected image; and execute display control processing of controlling a display so as to display the first composite image.

An aspect of the invention is a display control method, including: acquiring a captured image of a real space captured by an imaging apparatus; acquiring a virtual image based on a position and attitude of the imaging apparatus, estimated using a first captured image; generating a first corrected image by correcting the virtual image, based on a first attitude, which is an attitude of the imaging apparatus at a first time point that is later than an imaging time point of the first captured image; generating a first composite image by compositing a second captured image having been captured after the first captured image and the first corrected image; and controlling a display so as to display the first composite image.

Further features of the present invention will become apparent from the following description of exemplary embodiments with reference to the attached drawings.

BRIEF DESCRIPTION OF THE DRAWINGS

FIG. 5 is a diagram for describing a delay time according to the first embodiment;

DESCRIPTION OF THE EMBODIMENTS

Figure 1:
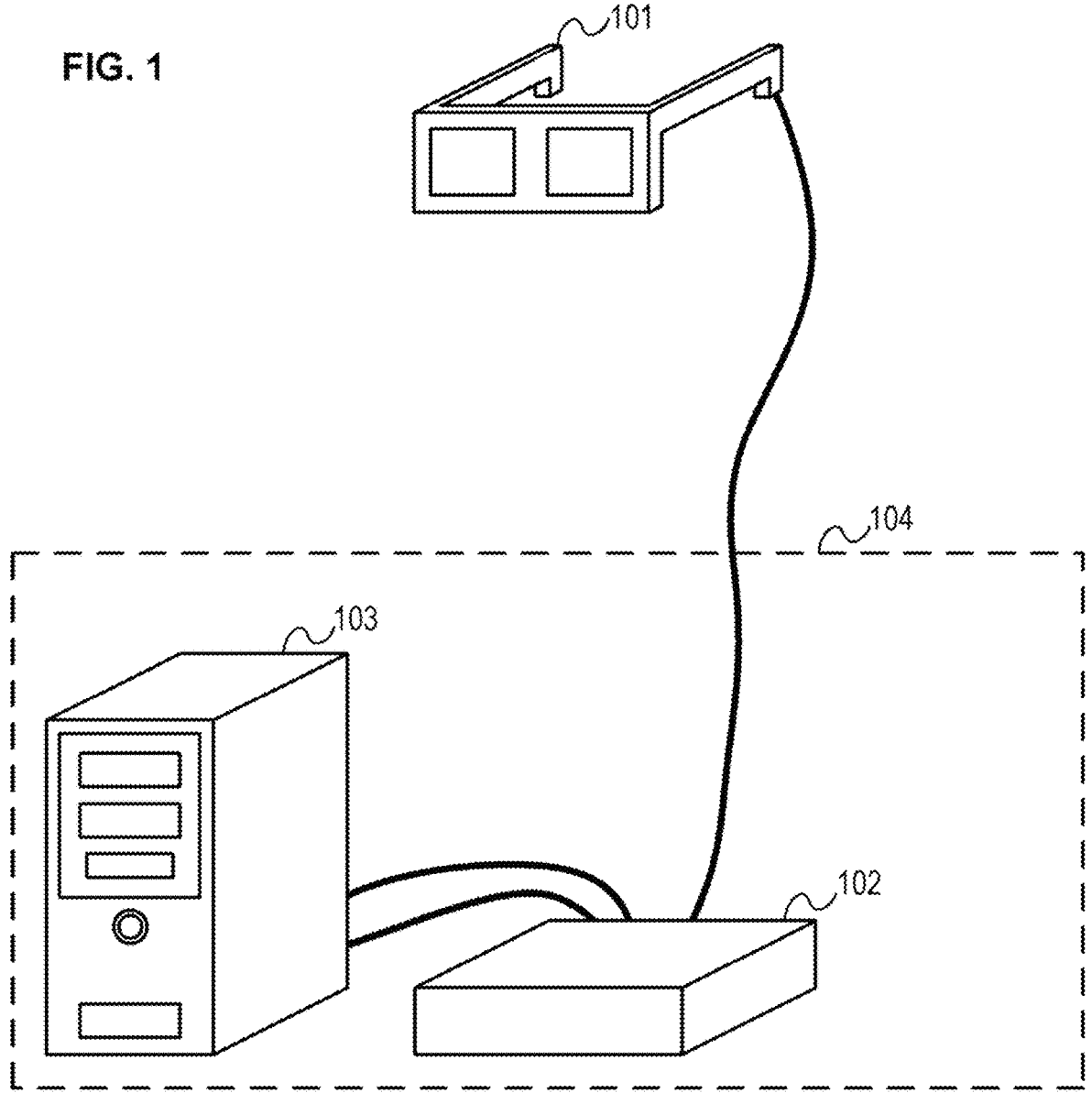
FIG. 1 is a configuration diagram of an MR system according to a first embodiment.

Hereinafter, embodiments will be described in detail with reference to the accompanying drawings. It should be noted that the embodiments described below are not intended to limit the invention pertaining to the scope of claims. While a plurality of features are described in the embodiments, all of the plurality of features are not necessarily essential to the invention and the plurality of features may be combined with each other in any way. Moreover, in the accompanying drawings, a same reference numeral will be assigned to a same or similar component and overlapping descriptions will be omitted.

First Embodiment

A configuration example of an MR system according to a first embodiment will be described with reference to FIG. 1. As shown in FIG. 1, the MR system includes an HMD 101, a controller 102, and a computer apparatus 103.

The HMD 101 is a display apparatus (image display apparatus) that can be worn on the head. The HMD 101 includes an imaging unit that captures images of a real space. The HMD 101 includes a sensor that acquires sensor data regarding a position and attitude of the HMD 101 (imaging unit). The HMD 101 includes a display unit that displays an image of a mixed reality space (a space that combines a real space and a virtual space).

The HMD 101 is also a control apparatus capable of synchronizing and controlling a plurality of devices. The HMD 101 transmits a captured image (a captured image of the real space) and sensor data to the controller 102. In addition, the HMD 101 can also acquire an image of the mixed reality space from the controller 102 and display the image on the display unit. Accordingly, an image of the mixed reality space is presented in front of the eyes of a user wearing the HMD 101 on his/her head.

The HMD 101 may be operated by power supplied from the controller 102 or operated by power supplied from a battery mounted to the HMD 101. In other words, a method of supplying power to the HMD 101 is not limited to a specific method.

The HMD 101 and the controller 102 are connected to each other in a wired manner in FIG. 1. However, the HMD 101 and the controller 102 may be wirelessly connected to each other or connected by a combination of wireless and wired connections. In other words, the connection between the HMD 101 and the controller 102 may be realized by any method.

The controller 102 applies various kinds of image processing (at least one of resolution conversion, color space conversion, correction of distortion in an optical system of the imaging unit included in the HMD 101, encoding, and the like) to a captured image transmitted from the HMD 101. In addition, the controller 102 transmits the captured image subjected to the image processing and the sensor data transmitted from the HMD 101 to the computer apparatus 103. Furthermore, the controller 102 applies image processing on the image of the mixed reality space transmitted from the computer apparatus 103. The controller 102 transmits the image of the mixed reality space subjected to image processing to the HMD 101.

Based on the captured image and the sensor data acquired from the controller 102, the computer apparatus 103 calculates the position and attitude of the HMD 101 (a position and attitude of the imaging unit included in the HMD 101) in detail. In addition, the computer apparatus 103 generates, as a virtual image, an image representing a virtual space as viewed from the HMD 101 with the calculated position and attitude. Subsequently, the computer apparatus 103 generates a composite image of the virtual image and the captured image (an image of the mixed reality space). The computer apparatus 103 transmits the composite image to the controller 102.

Figure 2:
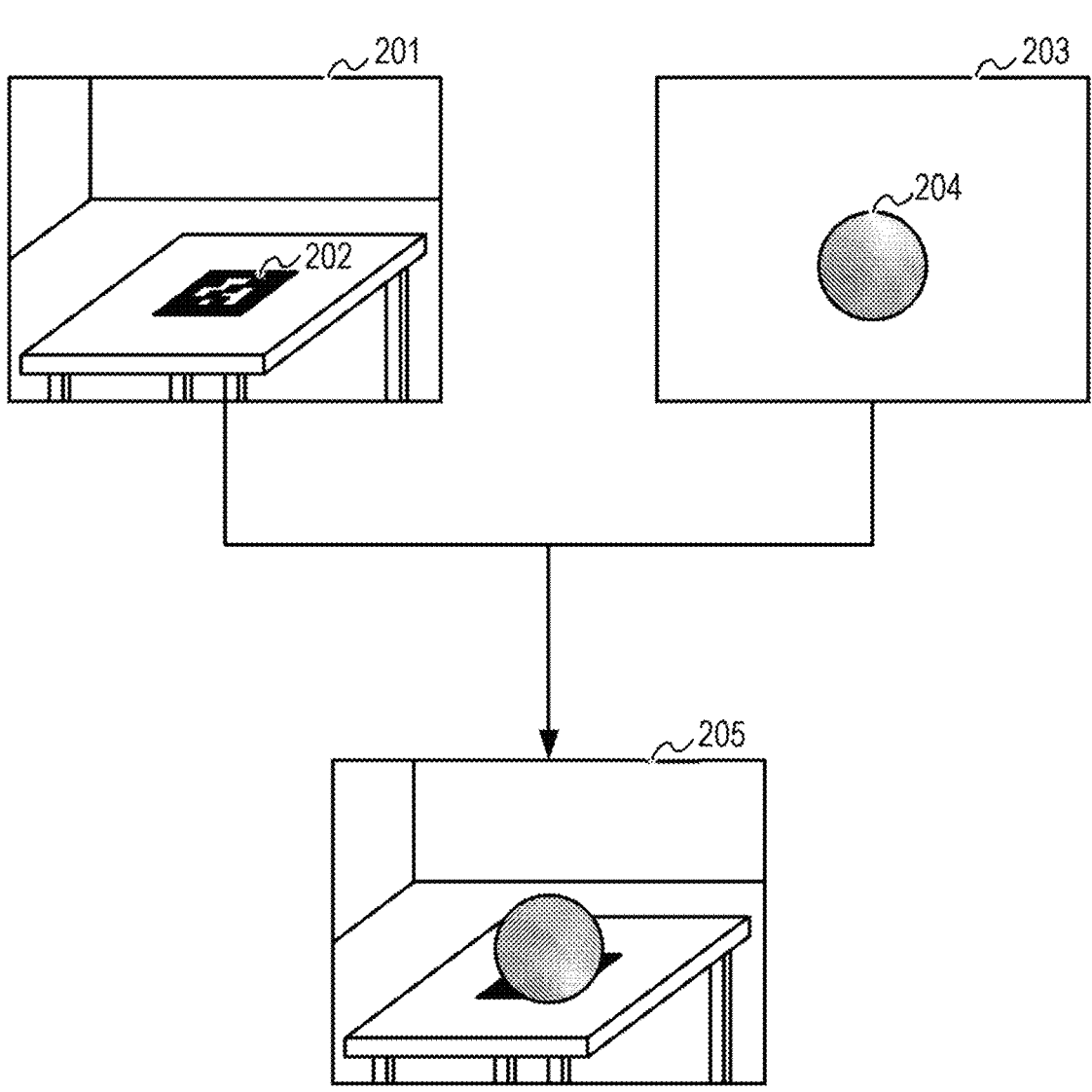
FIG. 2 is a diagram for describing a composite image according to the first embodiment.

Referring to FIG. 2, processing of generating a composite image by compositing the captured image and the virtual image will be described. It is assumed that a captured image 201 shows (contains) a marker 202 artificially arranged in real space. While there is one marker in FIG. 2 for simplicity of explanation, in reality, the captured image 201 may contain a plurality of markers.

The computer apparatus 103 extracts the marker 202 in the captured image 201. The computer apparatus 103 calculates the position and attitude of the HMD 101 based on the position and attitude of the marker 202 and the sensor data acquired from the controller 102. In addition, the computer apparatus 103 generates an image 203 (virtual image 203) representing a virtual space as viewed from the HMD 101 with the calculated position and attitude. The virtual image 203 contains a virtual object 204.

Subsequently, the computer apparatus 103 generates an image 205 of the mixed reality space that is a composite image by compositing the captured image 201 and the virtual image 203. The computer apparatus 103 transmits the image 205 to the HMD 101. The computer apparatus 103 may use information regarding a depth in three-dimensional space and/or information regarding transparency of the virtual object when performing the compositing. Based on the pieces of information, the computer apparatus 103 may generate a composite image that takes into account a front-back relationship between a real object and the virtual object or a composite image that composites the virtual object in a translucent state. Depending on a display mode set for the MR system (HMD 101), the HMD 101 may execute the processing of compositing the captured image and the virtual image.

While the computer apparatus 103 and the controller 102 are shown as separate apparatuses in FIG. 1, the computer apparatus 103 and the controller 102 may be integrated. In the first embodiment, a mode in which the computer apparatus 103 and the controller 102 are integrated will be described. Hereinafter, an "image processing apparatus 104" that is an apparatus integrating the computer apparatus 103 and the controller 102 will be described.

Figure 3:
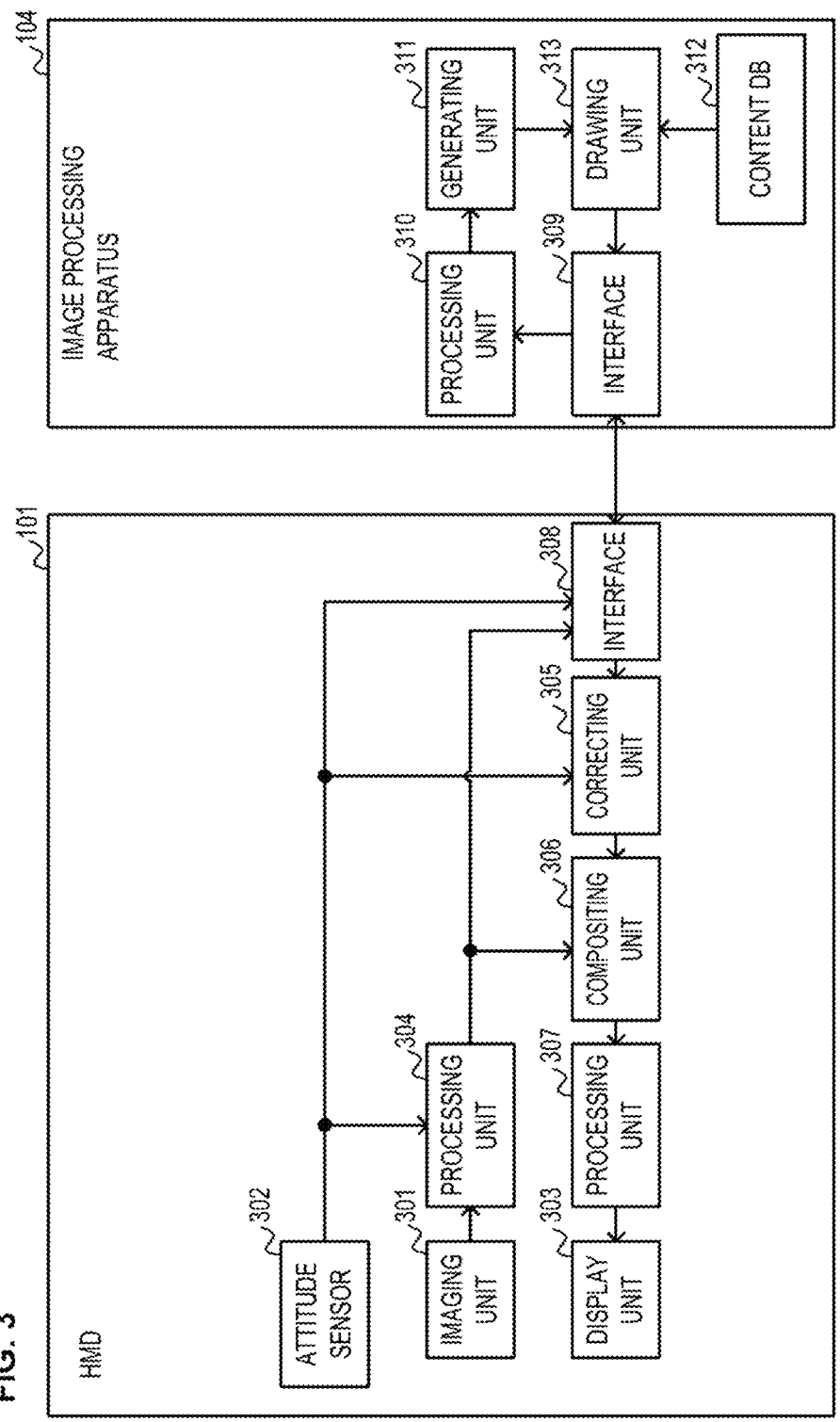
FIG. 3 is a configuration diagram of an HMD and an image processing apparatus according to the first embodiment.

Referring to FIG. 3, examples of respective functional configurations of the HMD 101 and the image processing apparatus 104 will be described.
(HMD)

The HMD 101 includes an imaging unit 301, an attitude sensor 302, a display unit 303, a processing unit 304, a correcting unit 305, a compositing unit 306, a processing unit 307, and an interface 308. The HMD 101 may include a control unit that controls each component of the HMD 101. For example, the control unit may operate as an imaging control unit to control imaging by the imaging unit 301 or as a display control unit to control display on the display unit 303.

The imaging unit 301 acquires a captured image by imaging real space. A captured image of one frame is used as an image (hereinafter, may be referred to as a "back-ground image") to be composited with a virtual image and also as an image (hereinafter, may be referred to as a "position image") used to generate position/attitude information. The imaging unit 301 includes an imaging element for the left eye and an imaging element for the right eye. The left-eye imaging element captures a moving image of the real space corresponding to the left eye of the user of the HMD 101. The left-eye imaging element outputs an image (captured image) of each frame in the captured moving image. The right-eye imaging element captures a moving image of the real space corresponding to the right eye of the user of the HMD 101. The right-eye imaging element outputs an image (captured image) of each frame in the captured moving image. In other words, the imaging unit 301 acquires, as a captured image, a stereo image including a parallax (a parallax that roughly matches respective positions of the left and right eyes of the user of the HMD 101). In the HMD for the MR system, a central optical axis of an imaging range of the imaging unit 301 is preferably positioned so as to be approximately aligned with a direction of a line of sight of the user of the HMD.

The left-eye imaging element and the right-eye imaging element each includes an optical system and an imaging device. Light incident from outside travels through the optical system to the imaging device. The imaging device outputs an image in accordance with the incident light as a captured image. An imaging element adopting a "rolling shutter system" can be used as the imaging device of the imaging unit 301. The plurality of imaging elements included in the imaging unit 301 start exposure every time a synchronization signal (a synchronization instruction; a pulse of a synchronization signal) is acquired and end the exposure when one frame's worth of exposure time elapses. After the end of exposure, the imaging unit 301 outputs the captured image and, at the same time, outputs a synchronization signal indicating an output start timing (image output timing) of the captured image.

The attitude sensor 302 acquires various kinds of necessary data (sensor data). The attitude sensor 302 calculates the position and attitude of the HMD 101 (imaging unit 301) based on the acquired sensor data. In addition, the attitude sensor 302 outputs information (positional information) on the position of the HMD 101 and information (attitude information) on the attitude of the HMD 101. The attitude sensor 302 includes at least any of a magnetic sensor, an ultrasonic sensor, an acceleration sensor, an angular rate sensor, and the like.

The display unit 303 includes a display unit for the right eye (a display unit arranged in front of the right eye) and a display unit for the left eye (a display unit arranged in front of the left eye). An image of a mixed reality space for the left eye is displayed on the left-eye display unit. An image of a mixed reality space for the right eye is displayed on the right-eye display unit. The left-eye display unit and the right-eye display unit each includes a display optical system and a display element.

An eccentric optical system such as a free-form prism may be used as the display optical system. Alternatively, an ordinary coaxial optical system or an optical system including a zooming mechanism may be used as the display optical system. For example, a small liquid crystal display, an organic EL display, or a retinal scanning-type device using MEMS can be used as the display element. Light of an image displayed on the display element is incident to the eye of the user via the display optical system.

The processing unit 304 applies various kinds of image processing on the captured image acquired by the imaging unit 301. In this case, the image processing applied to the background image and the image processing applied to the position image may differ from each other.

The correcting unit 305 corrects the virtual image acquired from the image processing apparatus 104 based on a change in attitude information acquired by the attitude sensor 302. First, the correcting unit 305 detects a change in the position and the orientation of the user based on a difference between attitude information at the time of imaging of the position image and attitude information at the time of imaging of the background image. In addition, the correcting unit 305 corrects a shape, a size, and the like of the virtual image in order to generate an appropriate image as viewed from a position of the user after the change. In this case, a shift in horizontal and vertical directions, a change in size by enlargement/reduction, a geometric transformation such as a homographic transformation, or the like is performed.

The correcting unit 305 can perform correction processing at a higher frame rate than a frame rate for drawing a virtual image in a drawing unit 313 to be described later. For example, there is a case where a virtual image is generated at 60 fps while the imaging unit 301 and the display unit 303 accommodate "imaging and display at 120 fps". In this case, at each timing when the background image reaches the correcting unit 305, the correcting unit 305 detects changes in a position and an orientation of the eyes of the user and corrects the virtual image based on the detection result. Accordingly, even when a sufficient frame rate cannot be realized in processing with a high load (such as arithmetic processing for generating information on a position and attitude or rendering processing of a virtual image), processing at a faster frame rate can be realized for the system as a whole from imaging to display.

The compositing unit 306 generates a composite image by compositing the virtual image corrected by the correcting unit 305 and the background image output from the imaging unit 301. In the compositing unit 306, chroma key compositing, alpha blending, or the like may be performed. In addition, in the compositing unit 306, more advanced composition processing that takes into account a front-back relationship between the background image and the virtual image may be performed by processing using depth information.

The processing unit 307 applies various kinds of image processing on the composite image generated by the compositing unit 306. The image processing performed at this point is, for example, adjustment processing of offset or gain. In addition, the image processing may be processing to compensate for the effects of individual variations in the components of the display unit 303 (display device and display optical system) such as pixel defect correction or processing for distortion correction of the display optical system.

The interface 308 is a transmission unit that transmits a position image output from the imaging unit 301, attitude information of the HMD 101 (information on the attitude of the imaging unit 301 at the time of imaging of the position image) output from the attitude sensor 302, and the like to the image processing apparatus 104. In addition, the interface 308 is also an acquisition unit that acquires a virtual image from the image processing apparatus 104.

(Image Processing Apparatus)

The image processing apparatus 104 receives the position image and the attitude information transmitted from the HMD 101 via an interface 309. The image processing apparatus 104 includes a processing unit 310, a generating unit 311, a content DB 312, and a drawing unit 313.

The processing unit 310 applies image processing on the position image received from the HMD 101. The image processing is preprocessing for the generating unit 311 in order to generate position/attitude information.

The generating unit 311 extracts (recognizes) feature points (natural feature points or markers) from the two images (left-eye position image and right-eye position image) having been subjected to image processing in the processing unit 304 and the processing unit 310. In addition, based on the extracted feature points (natural feature points or markers) and the attitude information received from the HMD 101, the generating unit 311 estimates (calculates) the position and attitude of each of the two imaging units (left-eye imaging unit and right-eye imaging unit) at the time of imaging of the position image. Since processing of estimating the position and attitude of the imaging unit at the time of imaging based on "markers in an image" and a "position and attitude as measured by a sensor included in the HMD together with the imaging unit having captured the image" is well known, a description of the technique will be omitted.

The content DB (database) 312 stores various kinds of data (virtual space data) necessary for drawing a virtual image. For example, the virtual space data includes data that defines a virtual object (for example, data that defines a geometry, a color, a texture, a position and attitude, and the like of the virtual object). In addition, for example, the virtual space data includes data that defines a light source arranged in the virtual space (for example, data that defines a type, a position and attitude, and the like of the light source).

The drawing unit 313 draws (constructs) a virtual space using virtual space data stored in the content DB 312. The drawing unit 313 generates a virtual image L representing the virtual space as seen from the left-eye imaging element (viewpoint) with the position and attitude calculated by the generating unit 311. In addition, the drawing unit 313 generates a virtual image R representing the virtual space as seen from the right-eye imaging element (viewpoint) with the position and attitude calculated by the generating unit 311. Furthermore, the drawing unit 313 transmits the virtual image L and the virtual image R to the HMD 101.

(Delay Time According to Comparative Example)

Figure 4:
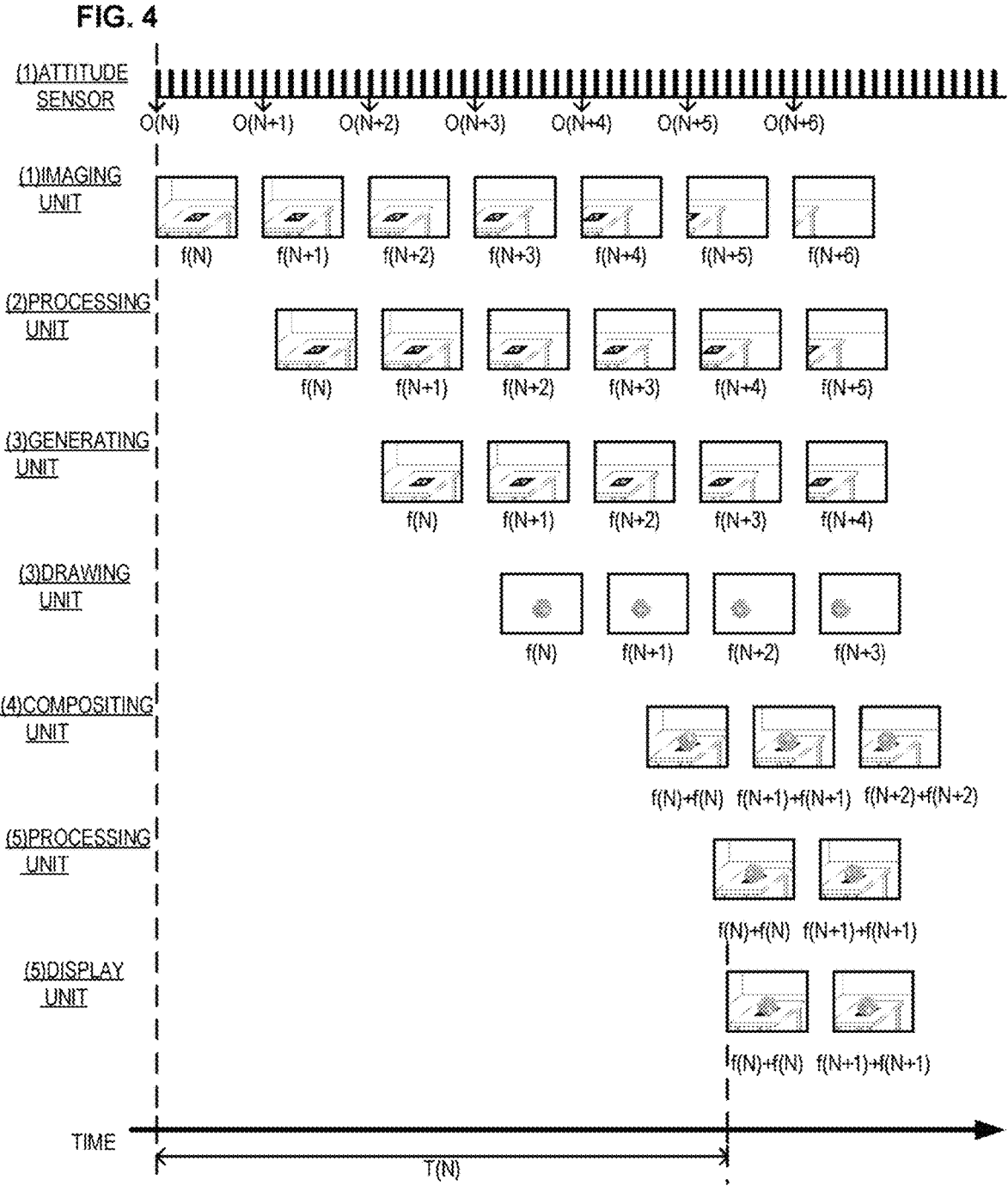
FIG. 4 is a diagram for describing a delay time according to a comparative example of the first embodiment.

Referring to FIGS. 4 and 5, a time difference (hereinafter, referred to as a "delay time") between a start time point of imaging (imaging time point) of a captured image contained in a composite image and a start time point of display of the composite image will be described. Since the shorter the delay time, the closer the image that can be viewed by the user to a present real space, the user can have an MR experience with higher reality. In FIGS. 4 and 5, an abscissa represents time (time point). First, referring to FIG. 4, a delay time of an MR system that does not include a "correcting unit that corrects a virtual image using attitude information" as a comparative example of the first embodiment will be described. In the comparative example, processing is performed in the following order from (1) to (5). In addition, hereinafter, processing until a "virtual image generated based on a captured image of a frame f(N)" is composited with the captured image and subsequently displayed will be mainly described.

(1) The imaging unit 301 sequentially acquires captured images of frame f(N), frame f(N+1), frame f(N+2), . . . .

In addition, the attitude sensor 302 measures various kinds of data and calculates the position and attitude of the HMD 101 (imaging unit 301). In this case, the attitude information of the HMD 101 at the "same time as or at a closest timing to the timing when the imaging unit 301 acquires the captured image of the frame f(N)" will be referred to as attitude information O(N) corresponding to the captured image of the frame f(N). When the timing of acquisition of the captured image by the imaging unit 301 and a timing of measurement by the attitude sensor 302 do not coincide with each other, the control unit and the like can calculate (interpolate) the attitude information at the timing based on a plurality of pieces of attitude information in a vicinity of the timing of acquisition of the captured image.

(2) The processing unit 304 and the processing unit 310 apply various kinds of image processing (including preprocessing necessary for calculating a position and attitude in the generating unit 311) on the captured image. In this step, since communication between the HMD 101 and the image processing apparatus 104 occurs, time including transmission delays at the interface 308 and the interface 309 elapses in each frame.

(3) The generating unit 311 calculates (estimates) the position and attitude of the HMD 101 at the time of imaging of the captured image based on the captured image and the attitude information. The drawing unit 313 draws a virtual image (image of virtual space) based on the calculated position and attitude of the HMD 101. At this point, processing times for the calculation of the position and attitude and drawing of the virtual image elapse.

(4) The compositing unit 306 composites the captured image and the virtual image. At this point, temporal consistency between the captured image that is a background image in the composite image and the virtual image is secured. To this end, the captured image used to draw the virtual image and the captured image to be used as a background in the composite image are the same captured image of the frame f(N).

(5) The processing unit 307 applies various kinds of image processing on the composite image. After the processing time by the processing unit 307 elapses, the display unit 303 displays the composite image.

At this point, the time taken from the start time point of imaging of the captured image of the frame f(N) to the start time point of display of the composite image of the frame f(N) is represented by a delay time T(N).

(Delay Time According to First Embodiment)

FIG. 5 is a diagram for describing a delay time of an MR system that includes a "correcting unit that corrects a virtual image using attitude information". First, after performing processing similar to (1) to (3) according to the comparative example described above, processing from (4) onward is performed. In addition, hereinafter, processing until a "virtual image generated based on a captured image of the frame f(N)" is composited with the captured image and subsequently displayed will be mainly described.

(4) The correcting unit 305 estimates a change in the attitude of the HMD 101 based on a change ΔIMU1 between past attitude information O(N) corresponding to the captured image (=position image) used for drawing the virtual image and the attitude information O(N+4) corresponding to the present captured image (=background image). The correcting unit 305 corrects the virtual image in accordance with an amount of attitude change.

(5) The compositing unit 306 composites the captured image (=background image) of a latest frame f(N+4) and the virtual image of the frame f(N) after correction. Accordingly, the compositing unit 306 generates a composite image. At this point, processing time required for compositing elapses.

As described above, in the MR system including the correcting unit 305, the position image used to draw the virtual image and the background image used as a background of the composite image are not the same captured image. In other words, correction processing based on motion prediction of the HMD 101 is performed on a virtual image generated based on the position and attitude of a captured image prior to the frame f(N+4). Therefore, the delay time required from imaging of the captured image of the frame f(N+4) to display of the composite image including the captured image of the frame f(N+4) can be reduced.

(6) The processing unit 307 applies various kinds of image processing on the composite image. After the processing time by the processing unit 307 elapses, the display unit 303 displays the composite image.

At this point, the time taken from the start time point of imaging of the captured image of the frame f(N+4) to the start time point of display of the composite image of the frame f(N+4) is represented by a delay time T'(N+4). In this case, the delay time T'(N+4) has been significantly reduced as compared to the delay time T(N) according to the comparative example.

(Correction Processing)

Figure 6:
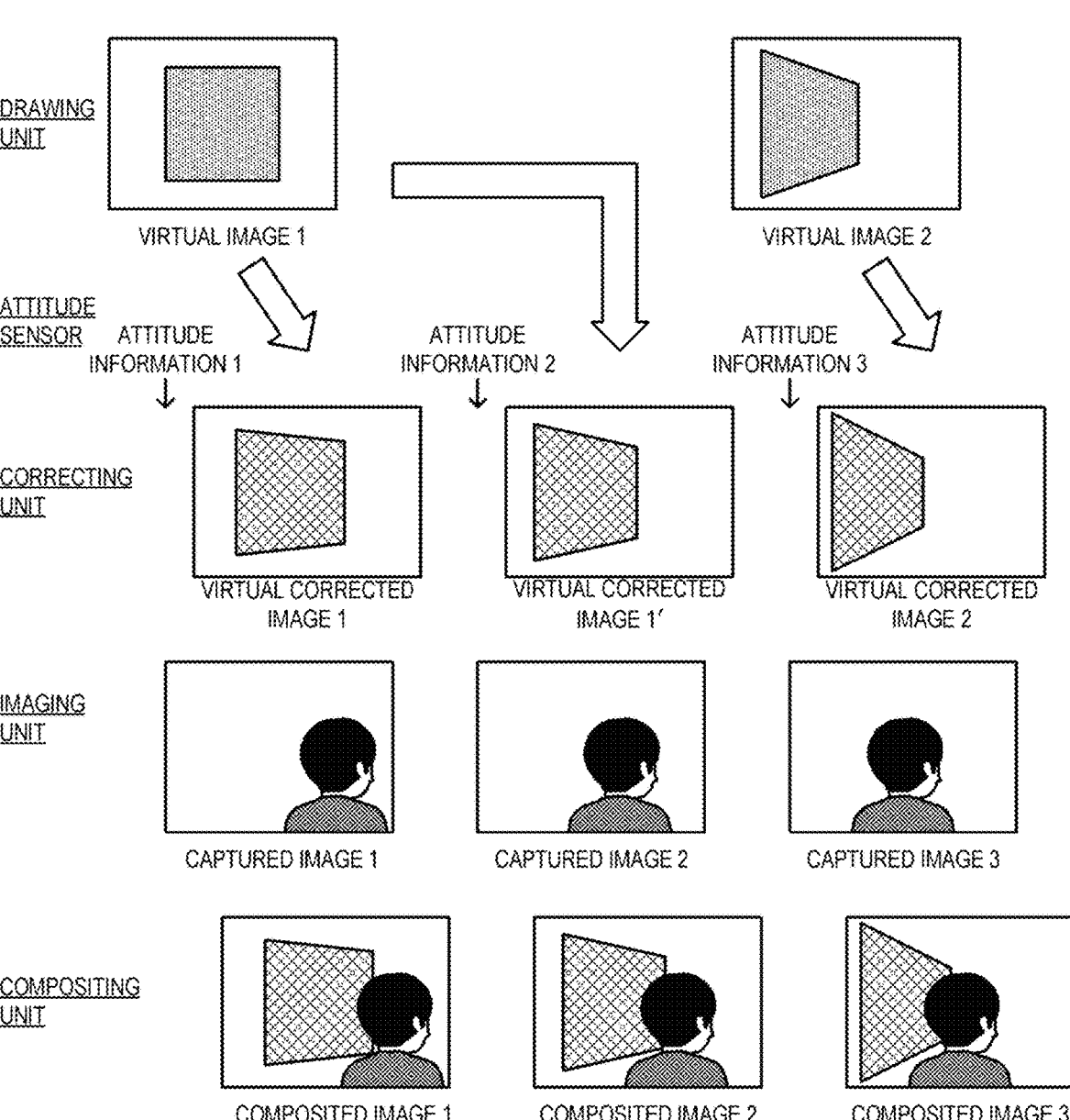
FIG. 6 is a diagram for describing correction processing according to the first embodiment.

Correction processing according to the first embodiment will be described with reference to FIG. 6. Hereinafter, a "captured image 1" is a captured image having been captured at an earlier time point than a "captured image 2", and the "captured image 2" is a captured image having been captured at an earlier time point than a "captured image 3".

The drawing unit 313 sequentially draws a "virtual image 1" and a "virtual image 2" at a predetermined cycle (for example, 60 fps) based on the position and attitude calculated using the captured images (position images) and the attitude information.

The correcting unit 305 generates a "virtual corrected image 1" by correcting the "virtual image 1" based on "attitude information 1" associated with the "captured image 1". In addition, the correcting unit 305 generates a "virtual corrected image 1'" by correcting the "virtual image 1" based on "attitude information 2" associated with the "captured image 2".

Next, the correcting unit 305 generates a "virtual corrected image 2" by correcting the "virtual image 2" based on "attitude information 3" associated with the "captured image 3". In addition, the correcting unit 305 generates a "virtual corrected image 2'" by correcting the "virtual image 2" based on "attitude information 4" associated with a "captured image 4" (not illustrated).

The compositing unit 306 generates a "composite image 1" by compositing the "captured image 1" and the "virtual corrected image 1". The compositing unit 306 generates a "composite image 2" by compositing the "captured image 2" and the "virtual corrected image 1'". The compositing unit 306 generates a "composite image 3" by compositing the "captured image 3" and the "virtual corrected image 2". The display unit 303 sequentially displays the "composite image 1", the "composite image 2", and the "composite image 3".

(Processing of MR System)

Figure 7:
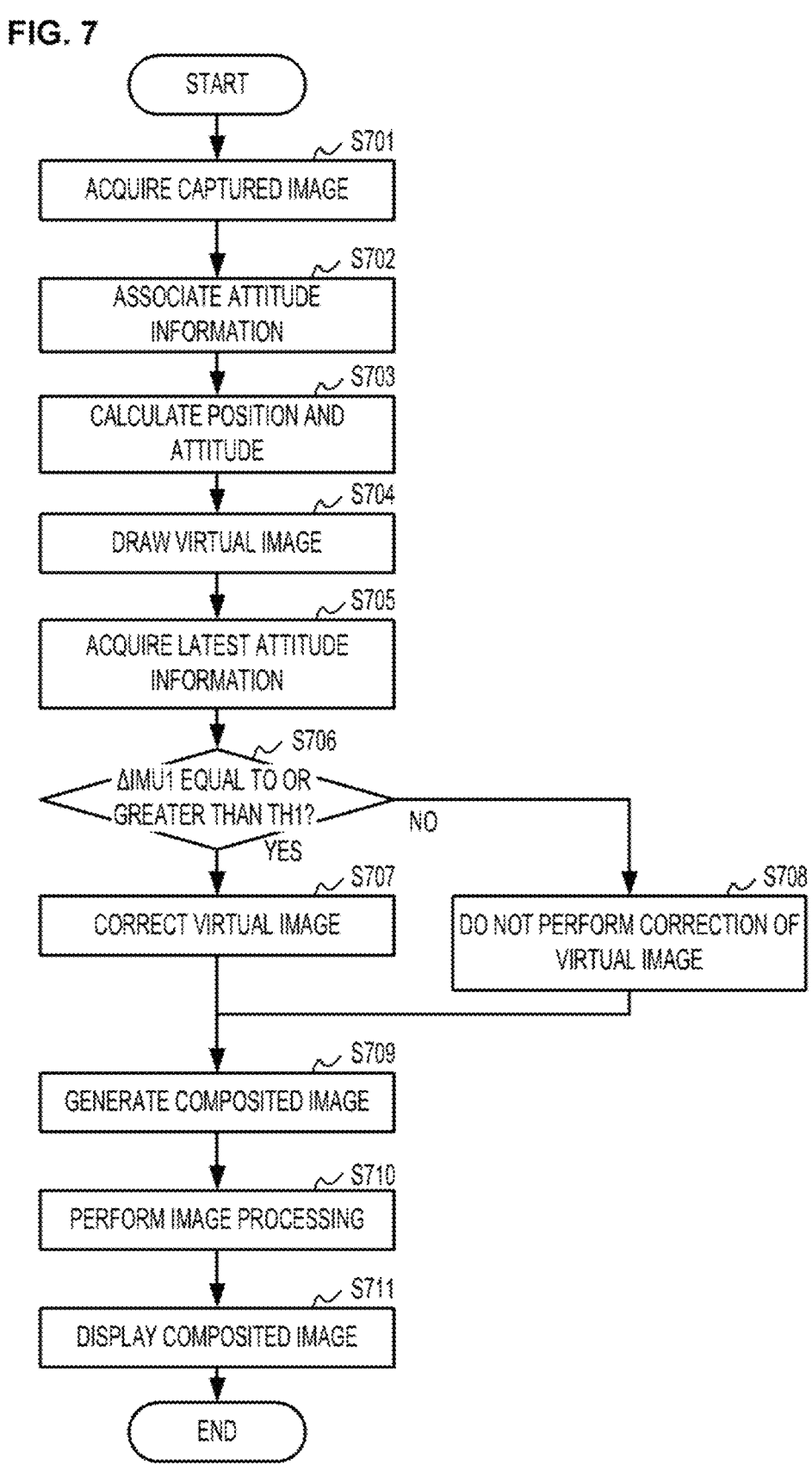
FIG. 7 is a flow chart of processing of the MR system according to the first embodiment.

Processing of the MR system according to the first embodiment will be described with reference to the flow chart in FIG. 7. Hereinafter, processing until a composite image of one frame is displayed will be described.

In step S701, the imaging unit 301 acquires a captured image by imaging real space.

In step S702, the processing unit 304 selects attitude information at the "same time as or a closest timing to the timing of acquisition of the captured image by the imaging unit 301" among the plurality of pieces of attitude information acquired by the attitude sensor 302. The processing unit 304 associates the selected attitude information with the captured image acquired in step S701.

In step S703, the generating unit 311 calculates (estimates) the position and attitude of the imaging unit 301 at the time of imaging of the captured image based on a feature point (a natural feature point or a marker) extracted from the captured image and the attitude information. In this case, the captured image used to calculate the position and attitude of the imaging unit 301 in step S703 is a "position image".

In step S704, based on the estimated position and attitude of the imaging unit 301, the drawing unit 313 draws (generates) a virtual image using virtual space data (virtual space data stored in the content DB 312).

In step S705, the correcting unit 305 acquires attitude information associated with a latest captured image to be used to generate a composite image. In this case, the latest captured image to be used to generate a composite image is a "background image".

In step S706, the correcting unit 305 determines whether or not the "change ΔIMU1 between the attitude information associated with the position image and the attitude information associated with the background image" is equal to or greater than a threshold TH1. When the change ΔIMU1 in attitude information is determined to be equal to or greater than the threshold TH1, the processing advances to step S707. When the change ΔIMU1 in attitude information is determined to be smaller than the threshold TH1, the processing advances to step S708.

In step S707, the correcting unit 305 corrects a shape, a size, and the like of the virtual image based on the change ΔIMU1 in attitude information. Accordingly, the correcting unit 305 generates a new virtual image as observed from the user after the change in attitude information.

In step S708, the correcting unit 305 does not correct the virtual image.

In steps S706 to S708, whether the virtual image is corrected or not is controlled according to whether or not the change ΔIMU1 in attitude information is equal to or greater than the threshold TH1. This is because when the change in attitude of the user wearing the HMD 101 is small, an amount of deformation of the virtual image is also small and the user will hardly feel the effect of the correction. In this manner, by not performing a correction when the change in the attitude of the HMD 101 is small, processing load can be reduced and a power-saving effect can be produced.

However, the determination of whether or not to perform correction of the virtual image by the correcting unit 305 may be made by a method other than that described above. For example, when the change ΔIMU1 is determined to be equal to or smaller than a threshold TH1' (TH1'>TH1), the virtual image may be corrected. When the change ΔIMU1 is determined to be greater than the threshold TH1', processing of correcting the virtual image need not be performed. This is because when the change in attitude is extremely large such as when the user quickly shakes his/her head, the user cannot correctly recognize the composite image and there is little need to improve reality.

In addition, whether or not to perform correction of the virtual image by the correcting unit 305 may be determined according to whether or not the change ΔIMU1 in attitude information is included in a default range. As described above, by not performing a correction when a magnitude of the change in attitude information is a specific magnitude, processing load can be reduced and a power-saving effect can be produced.

In step S709, the compositing unit 306 generates a composite image by compositing the background image (latest captured image) and the virtual image. In this case, when processing by step S707 is performed, the virtual image used in compositing is a virtual image of which a shape, a size, and the like have been corrected.

In step S710, the processing unit 307 applies various kinds of image processing on the composite image.

In step S711, the display unit 303 displays the composite image subjected to image processing by the processing unit 307.

As described above, the correcting unit 305 corrects the virtual image based on the attitude information associated with the position image. As a result, the time taken from the start time of imaging of the background image to the start time point of display of the composite image that is a composite of the background image and the virtual image can be significantly reduced. In addition, since virtual corrected images can be generated at an imaging cycle (for example, 120 fps) of captured images, composite images can be generated at a frame rate that exceeds drawing performance of virtual images.

In the MR system, conceivably, the frame rate of drawing may be reduced to further improve image quality of virtual images and the time required for drawing processing per frame may be increased. In the first embodiment, even in such a case, a virtual corrected image can be generated at a cycle corresponding to the imaging cycle of captured images by subjecting a virtual image to correction processing based on a difference between two pieces of attitude information.

Furthermore, even when a fluctuation in a processing load on the image processing apparatus 104 (processing load due to generation processing of attitude information or drawing processing) results in a temporary missing frame of a virtual image or the like, the virtual image is corrected based on the difference between the two pieces of attitude information. As a result, a missing virtual image can be interpolated.

Therefore, according to the first embodiment, by correcting a virtual image based on attitude information associated with a captured image, the user can have a more realistic MR experience.

Second Embodiment

In the first embodiment, both the "virtual corrected image 1" and the "virtual corrected image 1'" are generated in the correcting unit 305 using the "virtual image 1". In a second embodiment, an example of generating the "virtual corrected image 1'" based on the "virtual corrected image 1" will be described. In each of the second and subsequent embodiments, differences from the first embodiment will be described. In addition, unless otherwise described, it is assumed that each embodiment can be realized by the same components and the same processing as the first embodiment.

Figure 8:
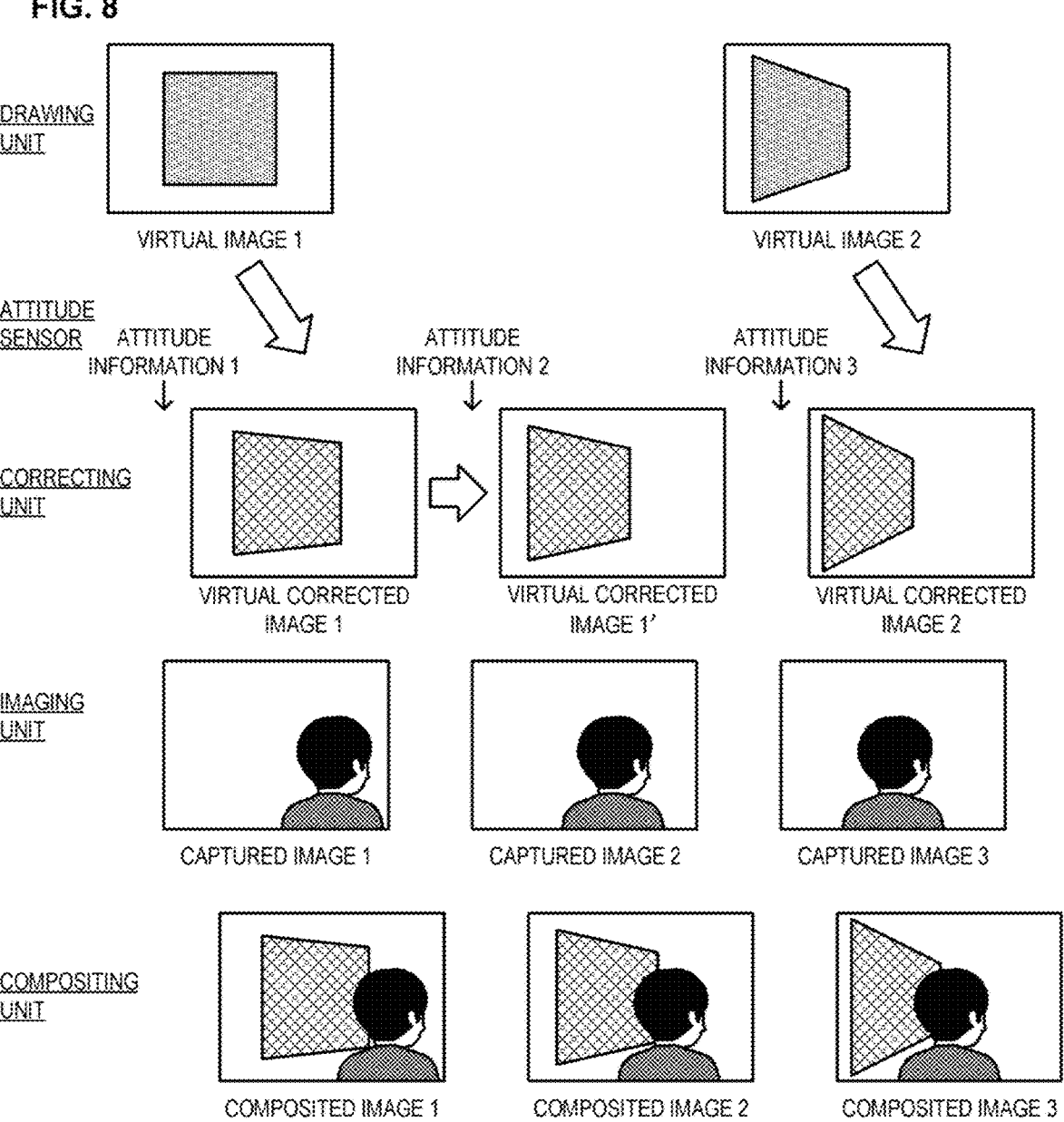
FIG. 8 is a diagram for describing correction processing according to a second embodiment.

Correction processing based on a change in attitude information according to the second embodiment will be described with reference to FIG. 8.

The drawing unit 313 sequentially draws a "virtual image 1" and a "virtual image 2" at a predetermined cycle (for example, 60 fps) based on the position and attitude calculated using a captured images and attitude information (position and attitude of the HMD 101 at the time of imaging of the captured image).

The correcting unit 305 generates a "virtual corrected image 1" by correcting the "virtual image 1" based on "attitude information 1" associated with a "captured image 1". Next, the correcting unit 305 generates a "virtual corrected image 1'" by correcting the "virtual corrected image 1" based on "attitude information 2" associated with a "captured image 2". Specifically, the correcting unit 305 generates the "virtual corrected image 1'" by correcting a shape, a size, and the like of the "virtual corrected image 1" according to a change (difference) between the "attitude information 2" and the "attitude information 1".

In addition, the correcting unit 305 generates a "virtual corrected image 2" by correcting the "virtual image 2" based on "attitude information 3" associated with a "captured image 3". The correcting unit 305 generates a "virtual corrected image 2'" by correcting the "virtual corrected image 2" based on "attitude information 4" associated with a "captured image 4" (not illustrated).

The compositing unit 306 generates a "composite image 1" by compositing the "captured image 1" and the "virtual corrected image 1". The compositing unit 306 generates a "composite image 2" by compositing the "captured image 2" and the "virtual corrected image 1'". The compositing unit 306 generates a "composite image 3" by compositing the "captured image 3" and the "virtual corrected image 2". In addition, the display unit 303 sequentially displays the "composite image 1", the "composite image 2", and the "composite image 3".

Figure 9:
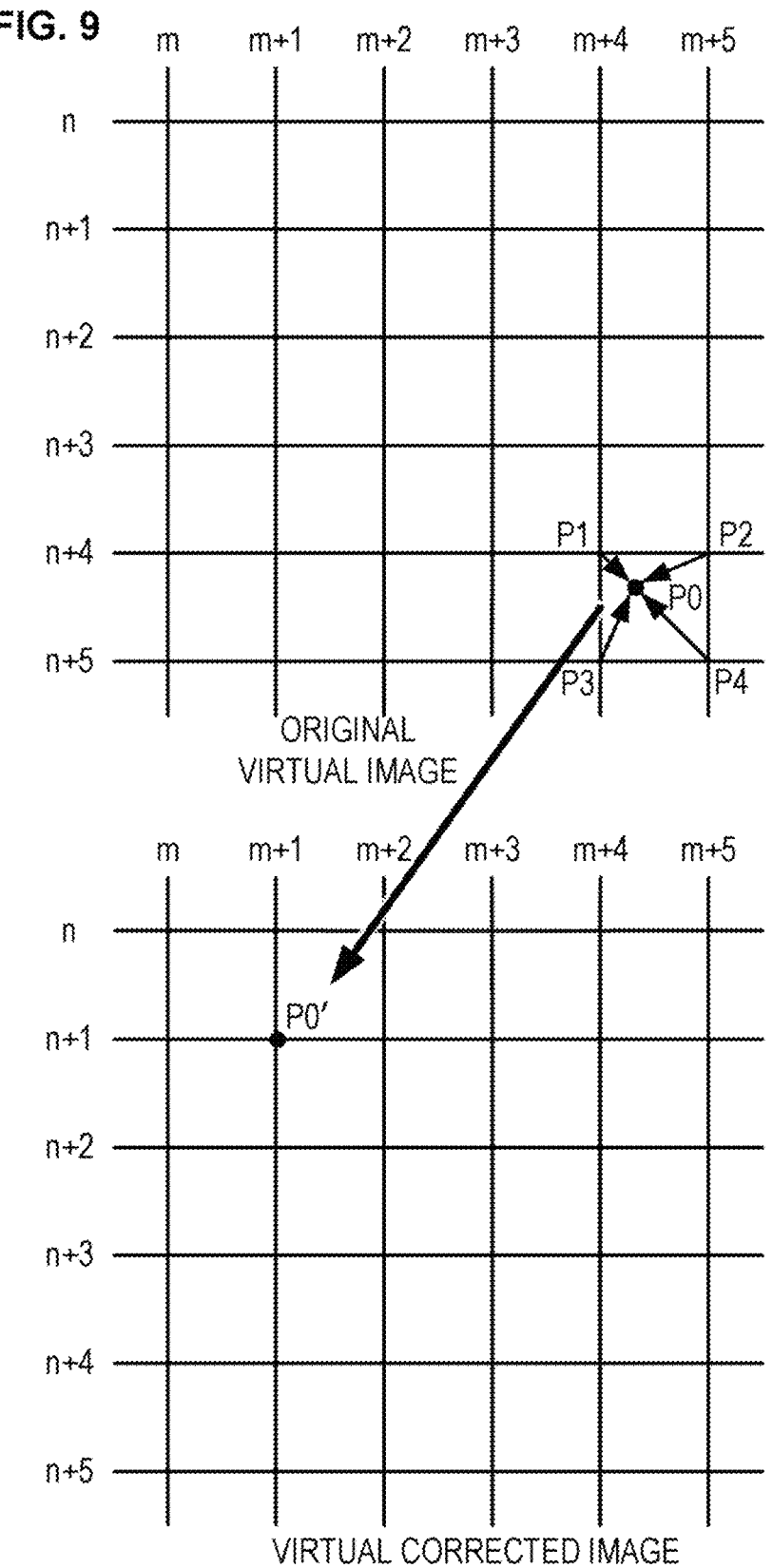
FIG. 9 is a diagram for describing correction of a virtual image according to the second embodiment.

Correction of a virtual image will be described with reference to FIG. 9. In the second embodiment, when correcting an image, a technique that projects one plane onto another plane using a projective transformation (for example, a technique such as homographic transformation) is used.

Now, a case where a virtual corrected image is generated from a given virtual image (hereinafter, referred to as an "original virtual image") will be assumed. In FIG. 9, grid points of the original virtual image and the virtual corrected image represent respective pixel coordinates. Considering the coordinates of the virtual corrected image as a reference, a pixel P0' in the virtual corrected image should correspond to a pixel P0 in the original virtual image. However, pixel data at the coordinates corresponding to the pixel P0' does not exist in the original virtual image. Therefore, the pixel data of each of the plurality of pixels (pixel P1, pixel P2, pixel P3, and pixel P4) that surround the pixel P0 is weighted according to a relative distance between each surrounding pixel and the pixel P0. In addition, data obtained by adding up the pieces of pixel data of the plurality of surrounding pixels that have been weighted and dividing the sum by "4" is calculated as the pixel data of the pixel P0'.

As described above, pixel data of all of the pixels of the virtual corrected image can be calculated based on the pixel data of the pixels of the original virtual image. In this case, after pixel data of an n-th row is sent in a raster scan order (in other words, from coordinates (n, m) to coordinates (n, m+5)), pixel data of an n+1-th row, and pixel data of an n+2-th row are sent sequentially. Therefore, the correcting unit 305 is unable to start processing of calculating pixel data of the pixel P0' at coordinates (n+1, m+1) of the virtual corrected image until pixel data of an n+5-th row that includes the pixel P3 and the pixel P4 of the original virtual image is input. Retaining (recording) the pixel data of the original virtual image requires memory capacity, and time is required until the start of processing of calculating the pixel data of the pixel P0' of the virtual corrected image. The larger an amount of deformation between the original virtual image and the virtual corrected image, the greater a distance in a row direction between the pixel P0 of the original virtual image and the pixel P0' of the virtual corrected image. Therefore, a larger memory capacity is required and, at the same time, the time required for processing also increases.

In consideration thereof, in the second embodiment, the correcting unit 305 uses the "virtual corrected image 1" as the original virtual image when correcting a virtual image based on the attitude information 2 that is associated with the "captured image 2". In this case, since the amount of deformation between the original virtual image and the virtual corrected image is smaller as compared to a case where the "virtual image 1" is used as the original virtual image, a required memory capacity decreases and, at the same time, the time required by processing also decreases.

According to the second embodiment, the "virtual corrected image 1" is used as the original virtual image for generating the "virtual corrected image 1'". Accordingly, the memory capacity required for correction processing can be suppressed and the time taken from the start time point of imaging of the captured image to the start time point of display of the composite image can be reduced. In addition, a virtual corrected image can be generated at an imaging cycle (for example, 120 fps) of a captured image in a similar manner to the first embodiment. Therefore, the HMD 101 can display a composite image at a frame rate exceeding drawing performance of a virtual image. As a result, the user can have a more realistic MR experience.

Third Embodiment

In the first and second embodiments, a captured image acquired by the imaging unit 301 is used as both a background image and a position image. In a third embodiment, in addition to the imaging unit 301 for acquiring a background image, the HMD 101 includes another imaging unit for acquiring a position image.

Figure 10:
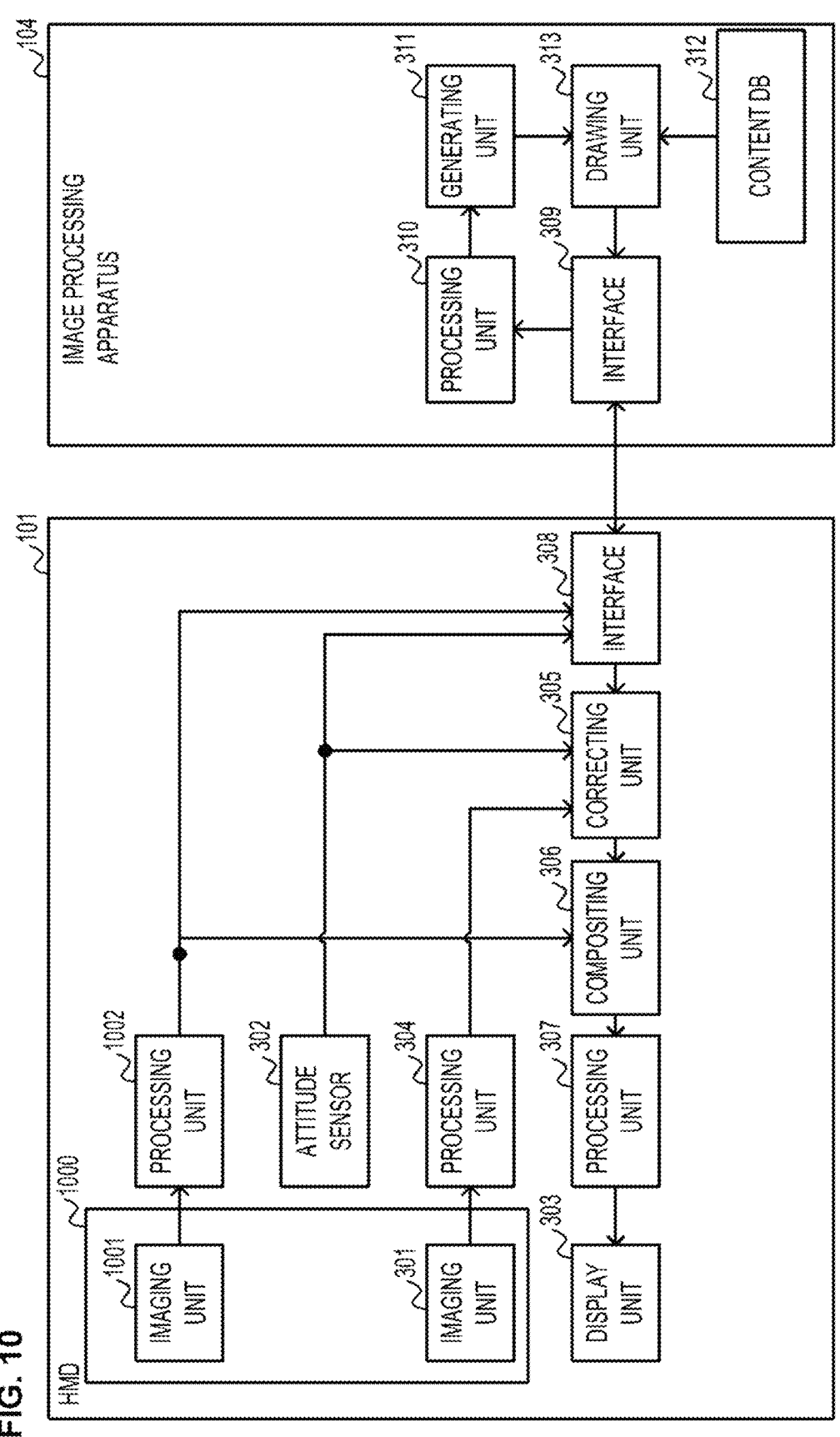
FIG. 10 is a configuration diagram of an HMD and an image processing apparatus according to a third embodiment.

Referring to FIG. 10, examples of respective functional configurations of the HMD 101 and the image processing apparatus 104 will be described. The HMD 101 includes the attitude sensor 302, the display unit 303, the processing unit 304, the correcting unit 305, the compositing unit 306, the processing unit 307, the interface 308, an imaging apparatus 1000, and a processing unit 1002. The imaging apparatus 1000 includes two imaging units: the imaging unit 301 and an imaging unit 1001. The image processing apparatus 104 includes the interface 309, the processing unit 310, the generating unit 311, the content DB 312, and the drawing unit 313 in a similar manner to the first embodiment.

The imaging unit 301 is configured in a similar manner to the imaging unit 301 according to the first embodiment. The imaging unit 301 acquires a captured image as a background image. On the other hand, the imaging unit 301 does not use the captured image as a position image.

The imaging unit 1001 includes a plurality of imaging elements for acquiring a position image. The imaging unit 1001 acquires a stereo image including a parallax as a position image. Each imaging element acquires a moving image by imaging a real space and outputs an image (captured image) of each frame in the moving image. Each of the two imaging elements included in the imaging unit 1001 includes an optical system and an imaging device. Light incident from outside is incident to the imaging device via the optical system and the imaging device outputs an image in accordance with the incident light.

In this case, the imaging unit 301 and the imaging unit 1001 may have different configurations in view of various matters such as a pixel count, image quality, noise, a sensor size, power consumption, or cost. In the imaging unit 301 and the imaging unit 1001, a rolling shutter-system imaging element and a global shutter-system imaging element may be used separately or both imaging elements may be used in combination depending on the application. For example, a rolling shutter-system imaging element capable of acquiring images with higher image quality is used for imaging of a background image. A global shutter-system imaging element without image deletion is used for imaging of a position image.

Image deletion refers to a phenomenon that occurs due to an operating principle of the rolling shutter system, in which exposure processing starts sequentially for each line in a scanning direction. Specifically, image deletion is known as a phenomenon in which an occurrence of a temporal discrepancy in a timing of exposure of each line results in recording of a deformed image in which a subject flows when the imaging unit or the subject moves during the exposure time. Since exposure processing is simultaneously performed on all lines in the global shutter system, a temporal discrepancy in the exposure timing of each line does not occur and, consequently, image deletion does not occur.

In an MR system according to the third embodiment, a rolling shutter-system imaging element is used as the imaging device of the imaging unit 301. A global shutter-system imaging element is used as the imaging device of the imaging unit 1001. In the third embodiment, the imaging unit 301 and the imaging unit 1001 are assumed to have approximately the same position and attitude. Therefore, the position and attitude of the imaging unit 301 can be equated with the position and attitude of the imaging unit 1001.

The processing unit 304 is configured in a similar manner to the processing unit 304 according to the first embodiment. The processing unit 304 applies various kinds of image processing on the background image acquired by the imaging unit 301.

The processing unit 1002 applies various kinds of image processing on the position image acquired by the imaging unit 1001.

A position image output from the imaging unit 1001 and attitude information output from the attitude sensor 302 are both transmitted to the image processing apparatus 104 via the interface 308.

In this manner, in the HMD 101, the imaging unit 301 and the imaging unit 1001 are configured separately. Therefore, by respectively selecting the most appropriate device for applications for background images and for position images, composite images with backgrounds of high image quality can be provided while achieving high positioning accuracy. As a result, the user can have a more realistic MR experience.

Generally, the processing for calculating a position and attitude using a position image can have a heavy computational load, and when the number of pixels in the position image is large, there is a possibility that a sufficient frame rate cannot be realized. Therefore, a device that acquires images with a low pixel count may conceivably be selected as the imaging unit 1001 for acquiring position images.

Furthermore, when the drawing frame rate of the drawing unit 313 is limited to 60 fps as in the third embodiment, a frame rate of 60 fps is also sufficient for a position image to be used to generate position/attitude information. Therefore, the frame rate of imaging of the imaging unit 1001 may be lower than the frame rate of imaging of the imaging unit 301. An amount of image data transmitted from the HMD 101 to the image processing apparatus 104 can be reduced by reducing the number of pixels in the position image acquired by the imaging unit 1001 and by setting the frame rate to 60 fps. Reducing the amount of transmitted data allows for thinner transmission cables between the interface 308 and the interface 309 and, furthermore, enables a transition to wireless communication to be achieved.

Fourth Embodiment

In the first to third embodiments, the HMD 101 corrects a virtual image based on attitude information associated with a captured image. In the fourth embodiment, the HMD 101 corrects each of a captured image and a virtual image based on attitude information associated with the captured image and latest attitude information.

Figure 11:
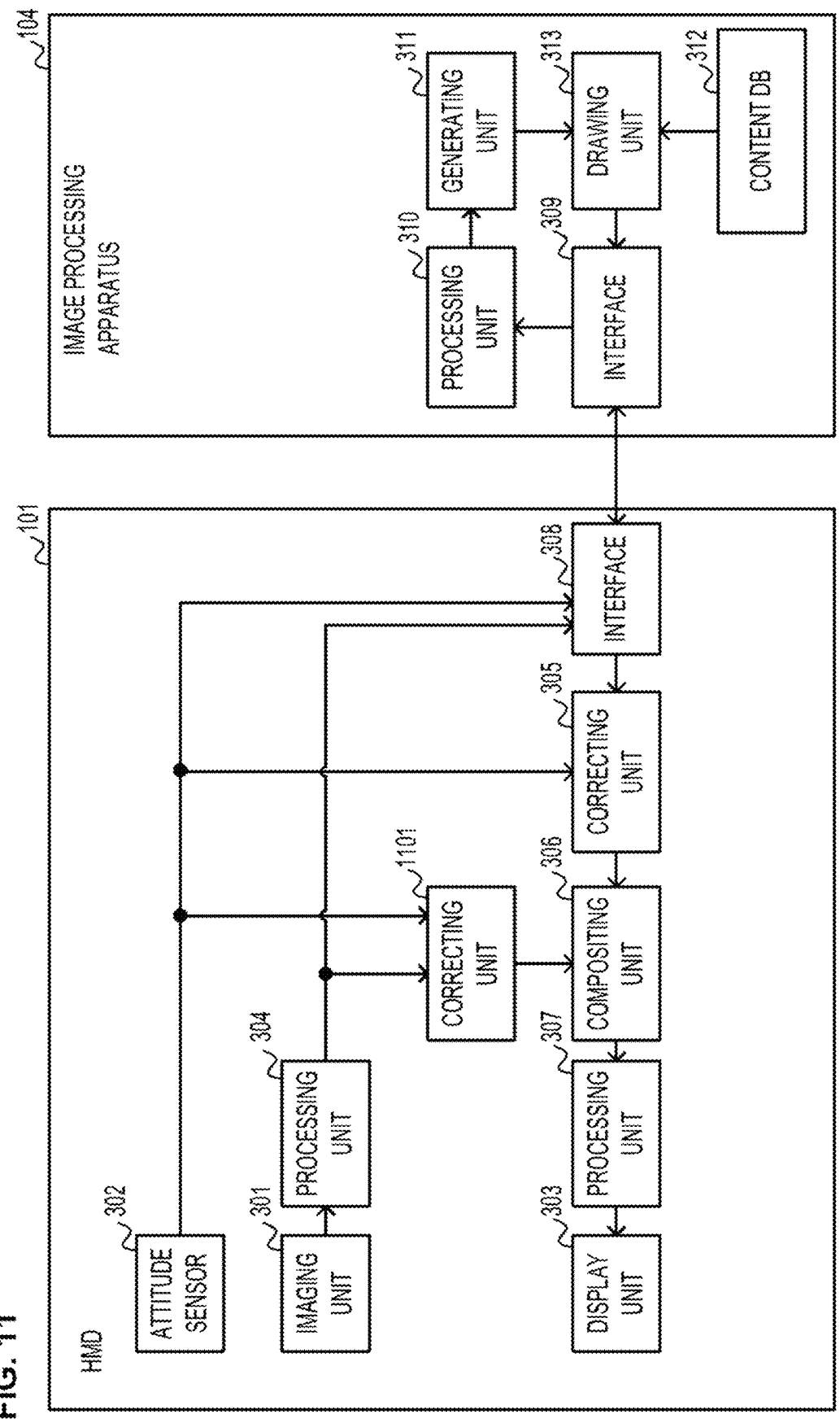
FIG. 11 is a configuration diagram of an HMD and an image processing apparatus according to a fourth embodiment.

Referring to FIG. 11, examples of respective functional configurations of the HMD 101 and the image processing apparatus 104 will be described. The HMD 101 includes the imaging unit 301, the attitude sensor 302, the display unit 303, the processing unit 304, the correcting unit 305, the compositing unit 306, the processing unit 307, the interface 308, and a correcting unit 1101. The image processing apparatus 104 includes the interface 309, the processing unit 310, the generating unit 311, the content DB 312, and the drawing unit 313 in a similar manner to the first embodiment.

The correcting unit 1101 corrects a captured image based on a change in attitude information measured by the attitude sensor 302. Correction processing by the correcting unit 1101 can be realized by a method similar to the correcting unit 305. The correction processing by the correcting unit 1101 can be performed at a higher frame rate than a frame rate for imaging in the imaging unit 301. For example, when a captured image is acquired at 60 fps and the display unit 303 accommodates display at 120 fps, the correcting unit 1101 corrects the captured image by detecting changes in a position (position of the eyes) and an orientation of the user for each cycle of a display timing.

In this manner, correction processing based on a change in the attitude information from the attitude sensor 302 is performed in each of the correcting unit 1101 and the correcting unit 305. Accordingly, processing at a faster frame rate can be realized for the system as a whole from imaging to display. In the correction processing performed by the correcting unit 1101 and the correcting unit 305, an amount of correction is determined according to an amount of change between attitude information associated with an image and latest attitude information at the time of execution of the correction. Therefore, in each correcting unit, processing is executed in separate correction amounts.

In the description given above, the frame rate for processing in the imaging unit and the drawing unit was set to 60 fps and the frame rate for display in the drawing unit was set to 120 fps. However, the frame rates of processing by the imaging unit, the drawing unit, and the display unit in the fourth embodiment are not limited to these frame rates. For example, a case where the frame rate for imaging by the imaging unit is 50 fps, the frame rate for drawing by the drawing unit is 45 fps, and the display unit accommodates display at a frame rate of 90 fps is conceivable. In this case, processing at a frame rate of 90 fps by the system as a whole can be realized by "performing compositing after correction is respectively performed by the correcting unit 1101 and the correcting unit 305" at each cycle of the display timing (at a frame rate of 90 fps). In addition, even if fluctuations occur in the respective frame rates due to "changes in settings of imaging and rendering processing", processing loads, fluctuations in communication conditions, or the like, compositing is performed after each correction has been performed for each cycle of the display timing. Accordingly, processing at a frame rate corresponding to the display unit for the system as a whole can be realized.

The compositing unit 306 generates a composite image by compositing a "virtual image corrected by the correcting unit 305" and a "captured image corrected by the correcting unit 1101".

(Delay Time According to Fourth Embodiment)

Figure 12:
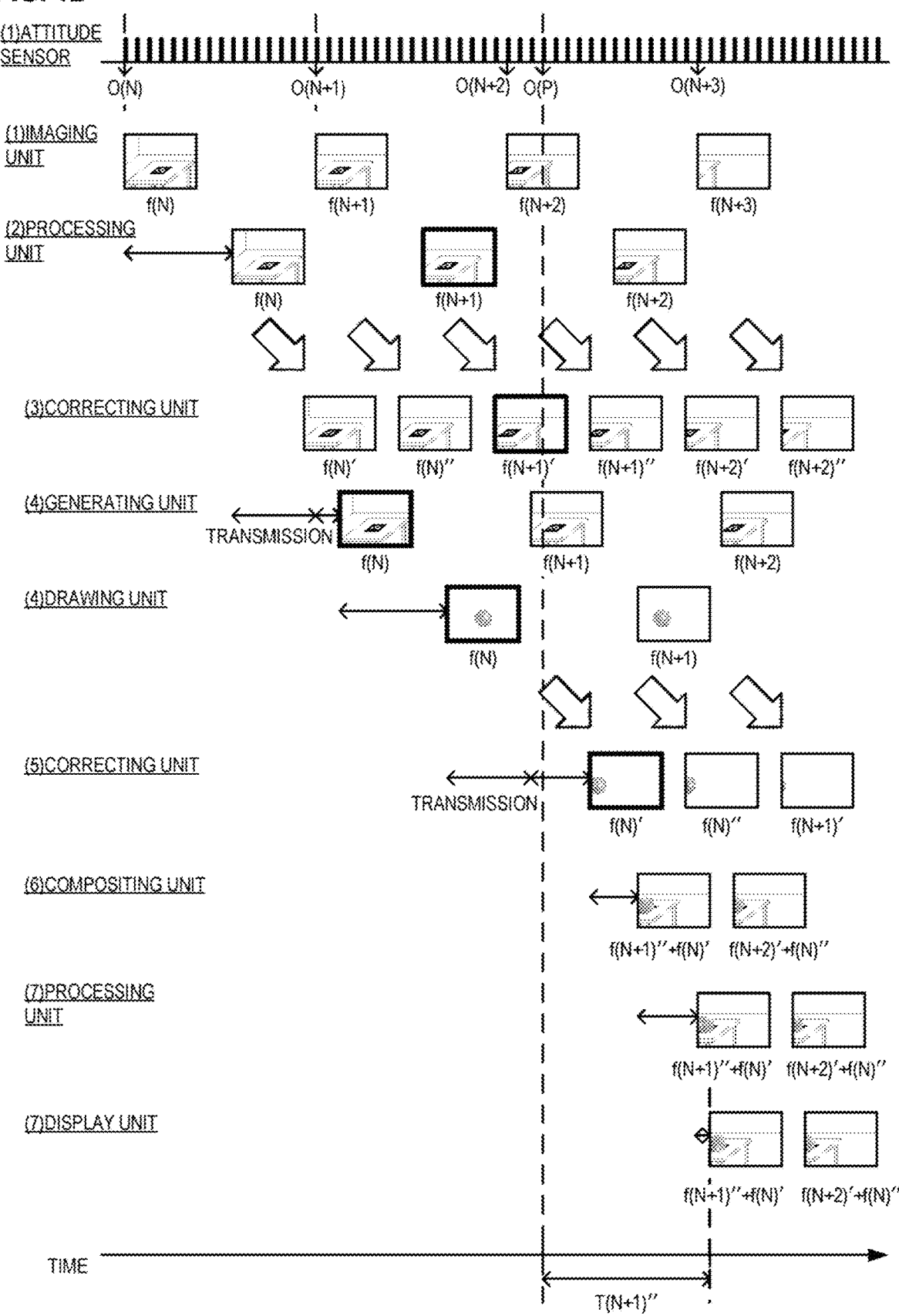
FIG. 12 is a diagram for describing a delay time according to the fourth embodiment.

A reduction in delay time according to the fourth embodiment will be described with reference to FIG. 12. In FIG. 12, an abscissa represents time. FIG. 12 is a diagram for describing a delay time of an MR system that includes the "correcting unit 1101 that corrects a captured image" and the "correcting unit 305 that corrects a virtual image".

(1) The imaging unit 301 sequentially acquires captured images of frame f(N), frame f(N+1), frame f(N+2), . . . .

The attitude sensor 302 measures various kinds of data and calculates (measures) the position and attitude of the HMD 101 (imaging unit 301). The attitude sensor 302 outputs attitude information of the HMD 101.

(2) The processing unit 304 and the processing unit 310 apply various kinds of image processing (including preprocessing necessary for calculating a position and attitude by the generating unit 311) on the captured image. Therefore, time including times of transmission delays at the interface 308 and the interface 309 elapses in each frame.

(3) The correcting unit 1101 estimates a change in the attitude of the HMD 101 (imaging unit 301) based on a change ΔIMU2 between past attitude information O(N+1) associated with a captured image of the frame f(N+1) and attitude information O(P) at the time of execution of correction of the captured image. In addition, the correcting unit 1101 corrects the captured image of the frame f(N+1) in accordance with an estimated amount of attitude change.

(4) The generating unit 311 calculates (estimates) the position and attitude of the HMD 101 based on a captured image of the frame f(N) and attitude information O(N). The drawing unit 313 draws a virtual image of the frame f(N) based on the calculated position and attitude. At this point, respective processing times elapse.

(5) The correcting unit 305 estimates a change in the attitude of the HMD 101 based on a change ΔIMU3 between the attitude information O(N) used to calculate the position and attitude and the attitude information O(P). The correcting unit 305 corrects the virtual image of the frame f(N) in accordance with an estimated amount of attitude change. Therefore, the virtual image of the frame f(N) and the captured image of the frame f(N+1) are corrected based on the attitude information O(P) that indicates the attitude of the HMD 101 at a same time point.

Since processing of (2) to (3) and processing of (4) to (5) are executed in parallel, the periods in which the processing is executed overlap. In addition, as shown in FIG. 12, processing of (4) could be started earlier than the processing of (2).

(6) The compositing unit 306 composites a captured image of a frame f(N+1)" after correction and a virtual image of a frame f(N)' after correction. At this point, respective processing times elapse. As described above, the MR system includes the "correcting unit 1101 that corrects a captured image" and the "correcting unit 305 that corrects a virtual image". In addition, the captured image and the virtual image are subjected to correction processing using motion prediction of the HMD 101. Accordingly, a time from the acquisition of the attitude information O(P) associated with the captured image of the frame f(N+1)" after correction until the display of a composite image generated using the captured image of the frame f(N+1)" is reduced.

(7) The processing unit 307 applies various kinds of image processing on the composite image. After the processing time by the processing unit 307 elapses, the display unit 303 displays the composite image.

At this point, the time taken from the acquisition of the attitude information O(P) associated with the captured image of the frame f(N+1)″ until the start time point of the display of a composite image generated using the captured image of the frame f(N+1)″ is represented by a delay time T(N+1)″. In this case, the delay time T(N+1)″ has been further reduced as compared to the delay time T′(N+4) shown in FIG. 5.

(Correction Processing)

Figure 13:
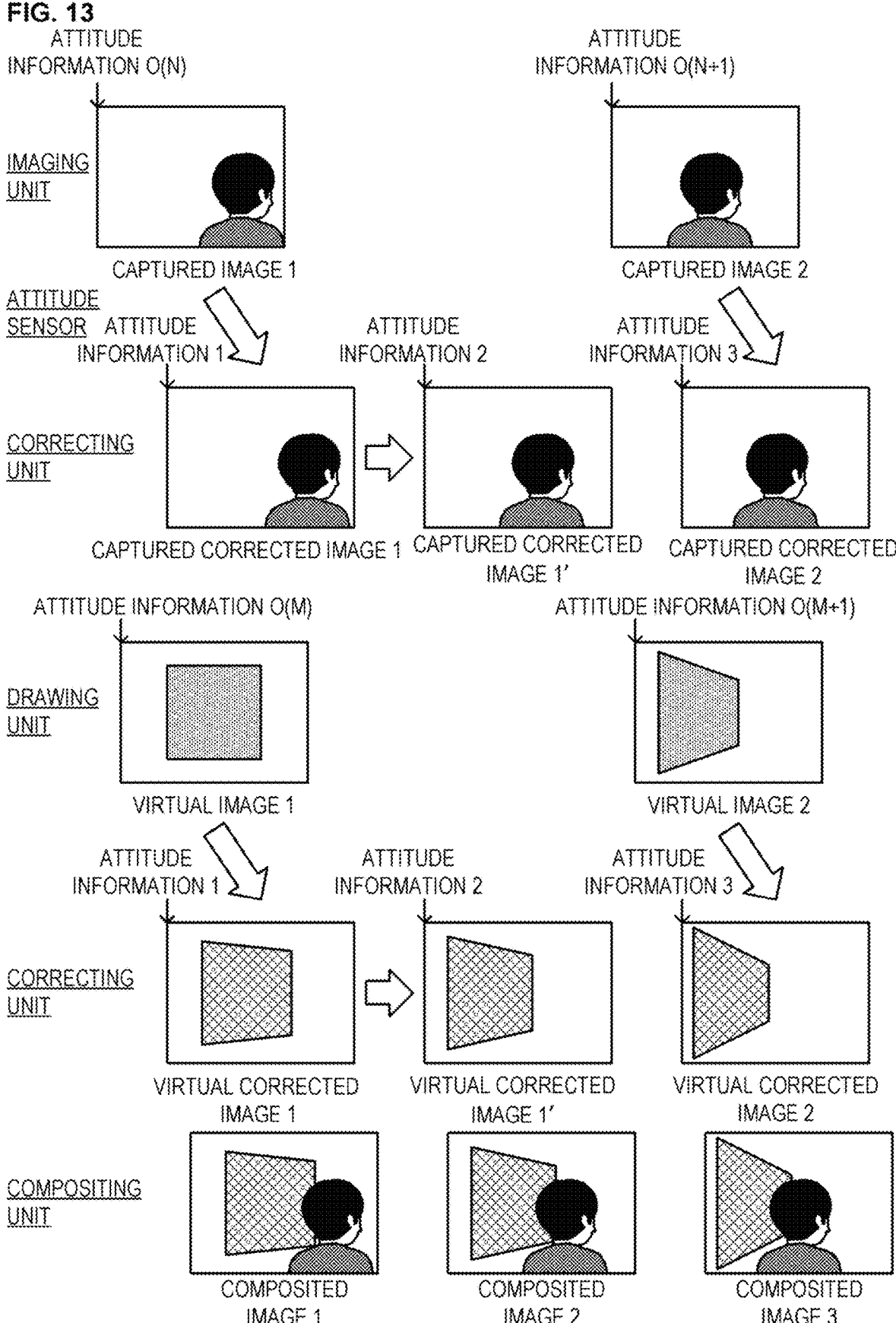
FIG. 13 is a diagram for describing correction processing according to the fourth embodiment.

Correction processing based on a change in attitude information according to the fourth embodiment will be described with reference to FIG. 13.

The imaging unit 301 sequentially acquires a "captured image 1" and a "captured image 2" at a predetermined cycle (for example, 60 fps).

The correcting unit 1101 corrects the "captured image 1" based on the attitude information O(N) associated with the "captured image 1" and attitude information 1 corresponding to the cycle of the display timing. Accordingly, the correcting unit 1101 generates a "captured corrected image 1". In addition, the correcting unit 1101 generates a "virtual corrected image 1′" by correcting the "captured corrected image 1" based on attitude information 2 corresponding to the cycle of the display timing.

Next, the correcting unit 1101 corrects the "captured image 2" based on the "attitude information O(N+1)" associated with the "captured image 2" and "attitude information 3" corresponding to the cycle of the display timing. Accordingly, the correcting unit 1101 generates a "captured corrected image 2". Furthermore, the correcting unit 1101 generates a "captured corrected image 2′" by correcting the "captured corrected image 2" based on attitude information 4 (not illustrated). The "captured corrected image 1′" may be generated by correcting the "captured image 1" based on the "attitude information O(N)" and the "attitude information 2". The "captured corrected image 2" may be generated by correcting the "captured image 2" based on the "attitude information O(N+1)" and the attitude information 4.

The drawing unit 313 sequentially draws a "virtual image 1" and a "virtual image 2" based on the position and attitude calculated using a captured image and attitude information at a predetermined cycle (for example, 60 fps).

The correcting unit 305 corrects the "virtual image 1" based on the attitude information O(M) associated with the "virtual image 1" and "attitude information 1" corresponding to the cycle of the display timing. Accordingly, the correcting unit 305 generates a "virtual corrected image 1". In addition, the correcting unit 305 generates a "virtual corrected image 1′" by correcting the "virtual corrected image 1" based on attitude information 2 corresponding to the cycle of the display timing.

Next, the correcting unit 305 corrects the "virtual image 2" based on the attitude information O(M+1) associated with the "virtual image 2" and "attitude information 3" corresponding to the cycle of the display timing. Accordingly, the correcting unit 305 generates a "virtual corrected image 2". Furthermore, the correcting unit 305 generates a "virtual corrected image 2′" by correcting the "virtual corrected image 2" based on "attitude information 4" (not illustrated).

The compositing unit 306 generates a "composite image 1" by compositing the "captured corrected image 1" and the "virtual corrected image 1". The compositing unit 306 generates a "composite image 2" by compositing the "captured corrected image 1′" and the "virtual corrected image 1′". The compositing unit 306 generates a "composite image 3" by compositing the "captured corrected image 2" and the "virtual corrected image 2". In addition, the display unit 303 sequentially displays the "composite image 1", the "composite image 2", and the "composite image 3".

(Processing of MR System)

Figure 14:
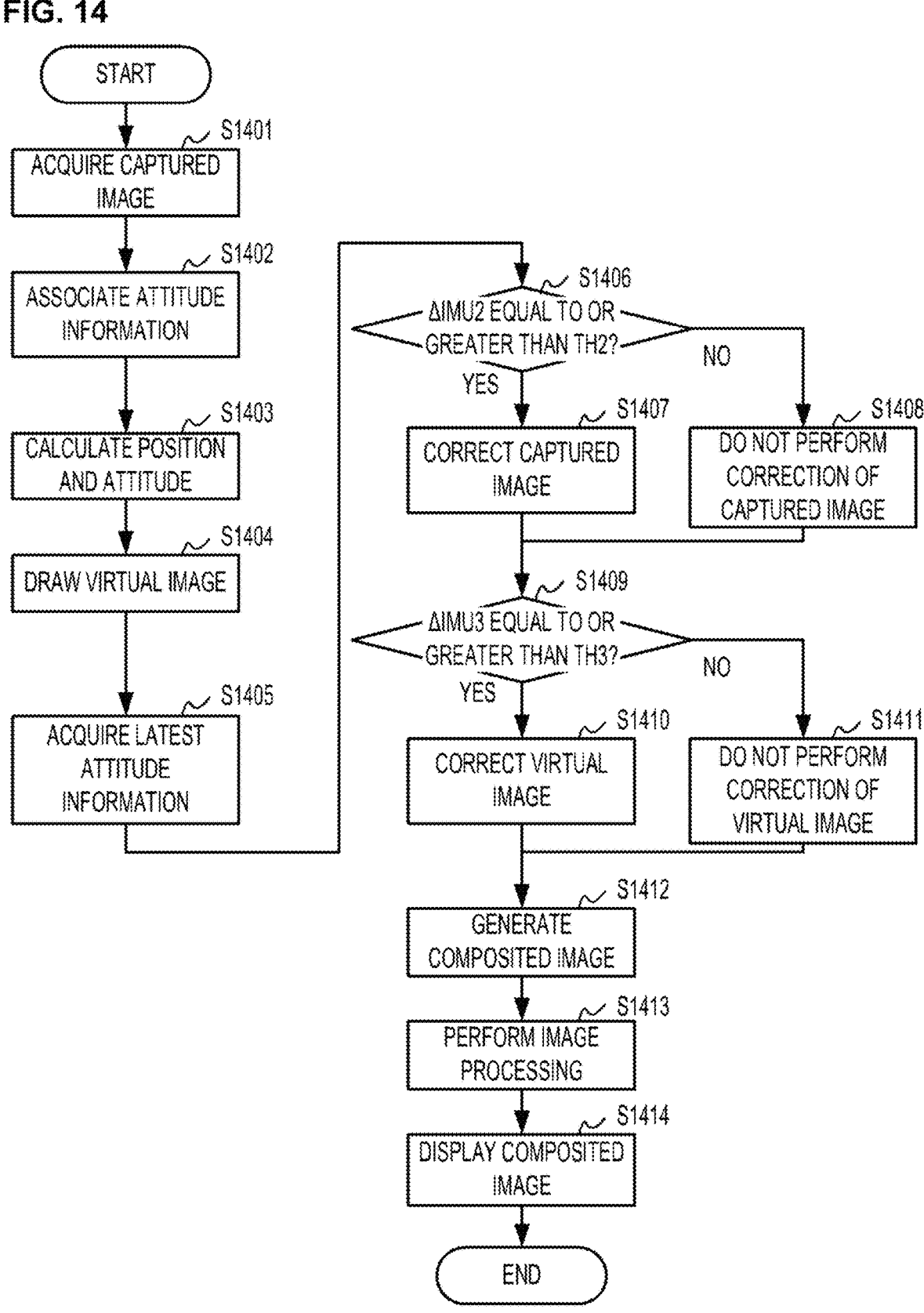
FIG. 14 is a flow chart of processing of an MR system according to the fourth embodiment.

Processing of the MR system according to the fourth embodiment will be described with reference to the flow chart in FIG. 14.

In steps S1401 to S1404, processing similar to steps S701 to S704 is performed.

In step S1405, the correcting unit 1101 and the correcting unit 305 acquire latest attitude information (attitude information of HMD 101; attitude information of imaging unit 301) corresponding to the cycle of the display timing.

In step S1406, the correcting unit 1101 determines whether or not the change ΔIMU2 between the attitude information associated with the captured image and the latest attitude information corresponding to the cycle of the display timing is equal to or greater than a threshold TH2. When the change ΔIMU2 in attitude information is determined to be equal to or greater than the threshold TH2, the processing advances to step S1407. When the change ΔIMU2 in attitude information is determined to be smaller than the threshold TH2, the processing advances to step S1408.

In step S1407, the correcting unit 1101 corrects a shape, a size, and the like of the captured image based on the change ΔIMU2 in attitude information. Accordingly, the correcting unit 1101 generates a new captured image as observed from a viewpoint of the user after the change in attitude information.

In step S1408, the correcting unit 1101 does not correct the captured image.

In step S1409, the correcting unit 305 determines whether or not a change ΔIMU3 between the attitude information associated with the position image and the latest attitude information corresponding to the cycle of the display timing is equal to or greater than a threshold TH3. When the change ΔIMU3 in attitude information is determined to be equal to or greater than the threshold TH3, the processing advances to step S1410. When the change ΔIMU3 in attitude information is determined to be smaller than the threshold TH3, the processing advances to step S1411.

In step S1410, the correcting unit 305 corrects a shape, a size, and the like of the virtual image based on the change ΔIMU3 in attitude information. Accordingly, the correcting unit 305 generates a new virtual image as observed from a viewpoint of the user after the change in attitude information.

In step S1411, the correcting unit 305 does not correct the virtual image.

In this case, the processing in steps S1406 to S1411 determines whether or not corrections to the captured image and the virtual image are performed according to whether or not the change in attitude information is equal to or greater than the thresholds. This is because when the change in attitude of the user is small, amounts of deformation of the captured image and virtual image also become small and the user will hardly feel the effect of the correction. As described above, by not performing a correction when the change in the attitude of the user is small, processing load can be reduced and a power-saving effect can be produced.

However, the correcting unit 1101 and the correcting unit 305 may determine whether or not to correct an image by other methods. For example, when the change in attitude information is determined to be equal to or smaller than a threshold, the image may be corrected. When the change in attitude information is determined to be not equal to or smaller than a threshold, the image need not be corrected. This is because when the change in attitude is extremely large such as when the user quickly shakes his/her head, the user cannot correctly recognize the composite image and there is little need to improve reality. In addition, the correcting unit 1101 and the correcting unit 305 may determine whether or not to correct an image according to whether or not the change in attitude information is included in a stipulated range. As described above, by not performing a correction when a magnitude of the change in attitude information is a specific magnitude, processing load can be reduced and a power-saving effect can be produced.

In step S1412, the compositing unit 306 composites the captured image and the virtual image. Accordingly, the compositing unit 306 generates a composite image. At this point, when both the captured image and the virtual image have been corrected, the "captured image corrected by the correcting unit 1101" and the "virtual image corrected by the correcting unit 305" are composited.

In step S1413, the processing unit 307 applies various kinds of image processing on the composite image generated by the compositing unit 306.

In step S1414, the display unit 303 displays the composite image subjected to image processing by the processing unit 307.

As described above, the correcting unit 1101 and the correcting unit 305 correct the captured image and the virtual image based on attitude information respectively associated with the captured image and the virtual image. Accordingly, the time taken from the acquisition of the attitude information O(P) at the time of execution of correction of the captured image to the display of the composite image can be reduced significantly.

In addition, captured corrected images and virtual corrected images can be generated at a cycle corresponding to the display cycle (for example, 120 fps) in the display unit and a frame rate of the system as a whole can be improved beyond the imaging performance of the imaging unit and the drawing performance of the drawing unit. Furthermore, in the fourth embodiment, even when a fluctuation in a processing load on the image processing apparatus 104 results in a temporary missing frame of a virtual image in a similar manner to the first embodiment, the virtual image is corrected based on a change in attitude information associated with a captured image. As a result, a missing virtual image can be interpolated. In addition, in the fourth embodiment, even if the frame rate of imaging by the imaging unit 301 is lower than the frame rate of display by the display unit 303, the corrected captured image can be output at a cycle corresponding to the display cycle.

According to the fourth embodiment, the correcting unit 1101 and the correcting unit 305 correct the captured image and the virtual image based on attitude information respectively associated with the captured image and the virtual image. Accordingly, the user can have a more realistic MR experience.

Fifth Embodiment

Each functional unit in the HMD 101 and the image processing apparatus 104 shown in FIG. 3, 10, or 11 may be implemented by hardware. A part of the functional units in the HMD 101 and the image processing apparatus 104 may be implemented by software (computer programs).

For example, in the HMD 101, the imaging unit 301, the imaging unit 1001, the attitude sensor 302, the display unit 303, and the interface 308 may be implemented by hardware. The remaining functional units of the HMD 101 may be implemented by software. In this case, the software is stored in a memory included in the HMD 101. In addition, the functions of the functional units can be realized as a processor included in the HMD 101 executes the software.

Figure 15A:
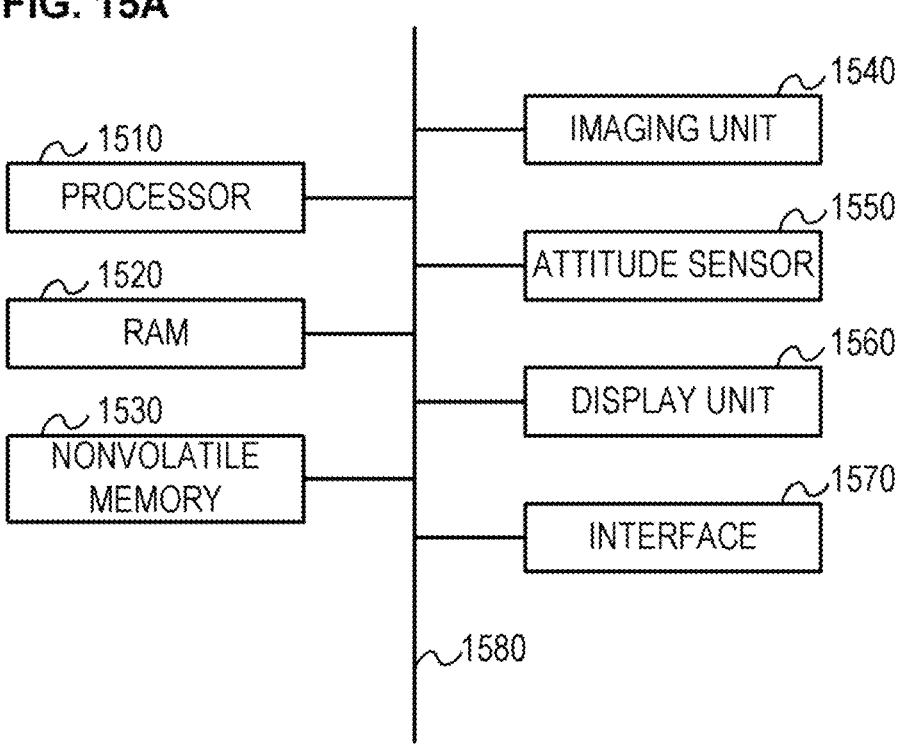
FIGS. 15A and 15B are hardware configuration diagrams of an MR system according to a fifth embodiment.

Such a hardware configuration example of the HMD 101 will be described using a block diagram in FIG. 15A. A processor 1510 executes various kinds of processing using a computer program and data stored in a RAM 1520. Accordingly, the processor 1510 performs operation control of the HMD 101 as a whole and executes or controls each kind of processing described above as being performed by the HMD 101.

The RAM 1520 includes an area for storing information (computer programs and data) loaded from a nonvolatile memory 1530 and an area for storing information acquired from the image processing apparatus 104 via an interface 1570. In addition, the RAM 1520 includes a work area used by the processor 1510 to execute the various kinds of processing. In this manner, the RAM 1520 can appropriately provide various kinds of areas.

The nonvolatile memory 1530 stores computer programs and data that allow the processor 1510 to execute or control the operation of the HMD 101. The nonvolatile memory 1530 stores a computer program for causing a CPU 1501 to execute the functions of the functional units of the HMD 101 (with the exception of the imaging unit 301, the imaging unit 1001, the attitude sensor 302, the display unit 303, and the interface 308). The computer programs and the data stored in the nonvolatile memory 1530 are loaded onto the RAM 1520 as appropriate according to control by the processor 1510 and become subject to processing by the processor 1510.

An imaging unit 1540 includes the imaging unit 301 and the imaging unit 1001 described above. An attitude sensor 1550 includes the attitude sensor 302 described above. A display unit 1560 includes the display unit 303 described above. An interface 1570 includes the interface 308 described above. The processor 1510, the RAM 1520, the nonvolatile memory 1530, the imaging unit 1540, the attitude sensor 1550, the display unit 1560, and the interface 1570 are all connected to a bus 1580. Note that the configuration shown in FIG. 15A is an example of a configuration that can be applied to the HMD 101 and can be modified or deformed as appropriate.

In addition, a computer apparatus capable of executing software corresponding to each functional part in the image processing apparatus 104 with the exception of the interface 309 and the content DB 312 can be applied to the image processing apparatus 104. A hardware configuration example of a computer apparatus that can be applied to the image processing apparatus 104 will be described using a block diagram in FIG. 15B.

The CPU 1501 executes various kinds of processing using computer programs and data stored in a RAM 1502 and a ROM 1503. Accordingly, the CPU 1501 performs operation control of the computer apparatus as a whole and executes or controls each kind of processing described above as being performed by the image processing apparatus 104 to which the computer apparatus is applied.

The RAM 1502 includes an area for storing computer programs and data loaded from the ROM 1503 and an external storage apparatus 1506. The RAM 1502 includes an area for storing data acquired from the HMD 101 via an interface 1507. In addition, the RAM 1502 includes a work area used by the CPU 1501 to execute the various kinds of processing. In this manner, the RAM 1502 can appropriately provide various kinds of areas. The ROM 1503 stores configuration data, startup programs, and the like of the computer apparatus.

An operating unit 1504 is a user interface that is a keyboard, a mouse, a touch panel, or the like. The operating unit 1504 can be operated by the user to input various instructions to the CPU 1501.

A display unit 1505 includes a liquid crystal screen, a touch panel screen, or the like. The display unit 1505 can display results of processing by the CPU 1501 in the form of images, texts, and the like. Note that the display unit 1505 may be a projection device (such as a projector) that projects images, texts, and the like.

The external storage apparatus 1506 is a large-capacity information storage apparatus such as a hard disk drive apparatus. The external storage apparatus 1506 stores an OS (operating system). The external storage apparatus 1506 stores computer programs and data to cause the CPU 1501 to execute the functions of the respective functional units (with the exception of the interface 309 and the content DB 312) of the image processing apparatus 104 shown in FIG. 3, 10, or 11. In addition, the external storage apparatus 1506 includes the content DB 312 described above.

The computer programs and the data stored in the external storage apparatus 1506 are loaded onto the RAM 1502 as appropriate according to control by the CPU 1501 and become subject to processing by the CPU 1501.

The interface 1507 is a communication interface for performing data communication with the HMD 101 and functions as the interface 309 described above. In other words, the present computer apparatus performs data communication with the HMD 101 via the interface 1507.

Figure 15B:
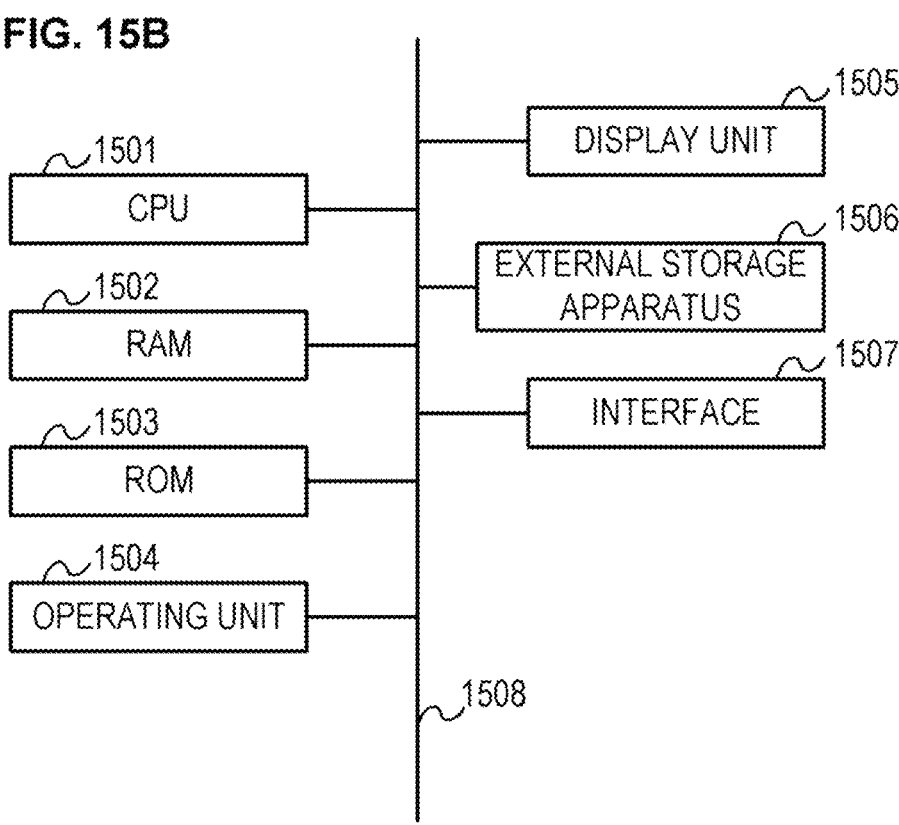

The CPU 1501, the RAM 1502, the ROM 1503, the operating unit 1504, the display unit 1505, the external storage apparatus 1506, and the interface 1507 are all connected to a bus 1508. Note that the configuration shown in FIG. 15B is an example of a configuration that can be applied to the image processing apparatus 104 and can be modified (deformed) as appropriate.

Sixth Embodiment

In each of the embodiments described above, markers having been artificially arranged in a real space were used to calculate a position and attitude of an imaging unit (HMD). However, in addition to or in place of the markers, natural features that exist in a real space (for example, corners of furniture such as chairs or desks, or corners of buildings, cars, or the like that make up a landscape) may be used to calculate the position and attitude of the imaging unit.

In addition, the configurations of the MR systems shown in FIGS. 3, 10, and 11 are examples. For example, each kind of processing described above as being performed by the HMD 101 may be executed by a plurality of apparatuses in a shared manner or each kind of processing described above as being performed by the image processing apparatus 104 may be executed by a plurality of apparatuses in a shared manner.

Furthermore, a "portable device including an imaging unit, an attitude sensor, and a display unit" such as a smartphone may be used in place of a head-mounted display apparatus. In addition, such a portable device may be added to the MR system in addition to the head-mounted display apparatus. In such a case, the image processing apparatus 104 generates an image of a mixed reality space in accordance with a position and attitude of the head-mounted display apparatus and distributes the image of the mixed reality space to the head-mounted display apparatus. Furthermore, the image processing apparatus 104 generates an image of a mixed reality space in accordance with a position and attitude of the portable device and distributes the image of the mixed reality space to the portable device. Note that the method of generating images of the mixed reality space is as described in the embodiments above.

In addition, the HMD 101 and the image processing apparatus 104 may be integrated. The portable device described above may be integrated with the image processing apparatus 104 instead of the head-mounted display apparatus.

Furthermore, while the attitude sensor 302 is described as being included in the HMD 101 in the embodiments described above, the attitude sensor 302 is not limited thereto. For example, the HMD 101 may obtain necessary information from images captured by objective cameras installed around a user of the HMD 101. In addition, the HMD 101 may only include an imaging unit and a display unit and may be controlled by a display control apparatus. In other words, the display control apparatus including components of the HMD 101 other than the "imaging unit and display unit" may execute processing of each embodiment.

According to the present invention, the user can have a more realistic MR experience.

In the description above, expressions such as "if A is at least B, the system control goes to Step S1, and if A is smaller (lower) than B, the system control goes to Step S2" may also be read as "if A is greater (higher) than B, the system control goes to Step S1, and if A is not greater than B, the system control goes to Step S2". Conversely, expressions such as "if A is greater (higher) than B, the system control goes to Step S1, and if A is not greater than B, the system control goes to Step S2" may also be read as "if A is at least B, the system control goes to Step S1, and if A is smaller (lower) than B, the system control goes to Step S2". In this manner, the phrase "at least A" may also be read as "greater (higher; longer; more) than A", and the phrase "not greater than A" may also be read as "smaller (lower; shorter; less) than A", as long as such reading does not cause any inconsistency. The phrase "greater (higher; longer; more) than A" may also be read as "at least A", and the phrase "smaller (lower; shorter; less) than A" may also be read as "not greater than A".

While the present invention has been described in detail based on embodiments thereof, the present invention is not limited to the specific embodiments and various modes without departing from the scope of the invention are also included in the present invention. Parts of the embodiments described above may be appropriately combined with each other.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-019294, filed on Feb. 13, 2024, which is hereby incorporated by reference herein in its entirety.

What is claimed is:

1. A display control apparatus comprising:
one or more processors and/or circuitry configured to:
(1) execute first acquisition processing of acquiring a captured image of a real space captured by an imaging apparatus;
(2) execute second acquisition processing of acquiring a virtual image based on a position and attitude of the imaging apparatus, estimated using a first captured image;
(3) execute first correction processing of generating a first corrected image by correcting the virtual image, based on a first attitude, which is an attitude of the imaging apparatus at a first time point that is later than an imaging time point of the first captured image;
(4) execute composition processing of generating a first composite image by compositing a second captured image having been captured after the first captured image and the first corrected image; and
(5) execute display control processing of controlling a display so as to display the first composite image,
wherein the imaging apparatus includes a first imaging apparatus and a second imaging apparatus,
wherein the first imaging apparatus acquires the first captured image by imaging the real space,
wherein the second imaging apparatus acquires the second captured image by imaging the real space, and wherein a frame rate of imaging by the first imaging apparatus is lower than a frame rate of imaging by the second imaging apparatus.

2. The display control apparatus according to claim 1, wherein in the first correction processing, the virtual image is corrected based on a first change that is a change in attitude between an attitude of the imaging apparatus corresponding to the first captured image and the first attitude.

3. The display control apparatus according to claim 2, wherein in a case where the first change is smaller than a first threshold, (1) in the first correction processing, the virtual image is not corrected, and (2) in the composition processing, the first composite image is generated by compositing the second captured image and the virtual image.

4. The display control apparatus according to claim 1, wherein the first attitude is an attitude of the imaging apparatus, calculated based on sensor data measured by a sensor.

5. The display control apparatus according to claim 1, wherein in the first correction processing, a second corrected image is further generated by correcting the first corrected image, based on a second attitude, which is an attitude of the imaging apparatus at a second time point that is later than the first time point,
wherein in the composition processing, a second composite image is generated by compositing a third captured image having been captured after the second captured image and the second corrected image, and
wherein in the display control processing, the display is controlled so as to display the second composite image.

6. The display control apparatus according to claim 1, wherein the first attitude is an attitude corresponding to the second captured image.

7. The display control apparatus according to claim 1, wherein the first attitude is an attitude of the imaging apparatus at a time point after an imaging time point of the second captured image,
wherein the one or more processors and/or circuitry are configured to further execute second correction processing of correcting the second captured image, based on the first attitude, and
wherein in the composition processing, the first composite image is generated by compositing the second captured image having been corrected in the second correction processing and the first corrected image.

8. The display control apparatus according to claim 7, wherein in the second correction processing, the second captured image is corrected, based on a second change that is a change in attitude between an attitude of the imaging apparatus corresponding to the second captured image and the first attitude.

9. The display control apparatus according to claim 8, wherein in a case where the second change is smaller than a second threshold, (1) in the second correction processing, the second captured image is not corrected, and (2) in the composition processing, the first composite image is generated by compositing the second captured image that has not been corrected and the first corrected image.

10. The display control apparatus according to claim 1, further comprising the display.

11. A system comprising:
a display control apparatus comprising one or more processors and/or circuitry configured to: (1) execute first acquisition processing of acquiring a captured image of a real space captured by an imaging apparatus; (2) execute second acquisition processing of acquiring a virtual image based on a position and attitude of the imaging apparatus, estimated using a first captured image; (3) execute first correction processing of generating a first corrected image by correcting the virtual image, based on a first attitude, which is an attitude of the imaging apparatus at a first time point that is later than an imaging time point of the first captured image; (4) execute composition processing of generating a first composite image by compositing a second captured image having been captured after the first captured image and the first corrected image; and (5) execute display control processing of controlling a display so as to display the first composite image; and an image processing apparatus that executes drawing processing of drawing the virtual image, based on a position and attitude of the imaging apparatus estimated using the first captured image, wherein at least one of (i) a frame rate of display by the display and (ii) a frame rate of imaging by the imaging apparatus is higher than a frame rate of drawing in the drawing processing.

12. The system according to claim 11, wherein a frame rate of display by the display is higher than a frame rate of drawing in the drawing processing.

13. The system according to claim 11, wherein a frame rate of imaging by the imaging apparatus is higher than a frame rate of drawing in the drawing processing.

14. The system according to claim 11, wherein both (i) a frame rate of display by the display and (ii) a frame rate of imaging by the imaging apparatus are higher than a frame rate of drawing in the drawing processing.

15. The system according to claim 11, wherein the display control apparatus and the image processing apparatus are mounted in a same head-mounted display housing.

16. The system according to claim 11, further comprising the display.

17. A display control method comprising:

acquiring a captured image of a real space captured by an imaging apparatus;

acquiring a virtual image based on a position and attitude of the imaging apparatus, estimated using a first captured image;

generating a first corrected image by correcting the virtual image, based on a first attitude, which is an attitude of the imaging apparatus at a first time point that is later than an imaging time point of the first captured image;

generating a first composite image by compositing a second captured image having been captured after the first captured image and the first corrected image; and controlling a display so as to display the first composite image, wherein the imaging apparatus includes a first imaging apparatus and a second imaging apparatus, wherein the first imaging apparatus acquires the first captured image by imaging the real space, wherein the second imaging apparatus acquires the second captured image by imaging the real space, and wherein a frame rate of imaging by the first imaging apparatus is lower than a frame rate of imaging by the second imaging apparatus.

18. A non-transitory computer-readable medium that stores a program, wherein the program causes a computer to execute a display control method, the display control method comprising:

acquiring a captured image of a real space captured by an imaging apparatus;

acquiring a virtual image based on a position and attitude of the imaging apparatus, estimated using a first captured image;

generating a first corrected image by correcting the virtual image, based on a first attitude, which is an attitude of the imaging apparatus at a first time point that is later than an imaging time point of the first captured image;

generating a first composite image by compositing a second captured image having been captured after the first captured image and the first corrected image; and controlling a display so as to display the first composite image, wherein the imaging apparatus includes a first imaging apparatus and a second imaging apparatus, wherein the first imaging apparatus acquires the first captured image by imaging the real space, wherein the second imaging apparatus acquires the second captured image by imaging the real space, and wherein a frame rate of imaging by the first imaging apparatus is lower than a frame rate of imaging by the second imaging apparatus.

19. A head-mounted display comprising:

a display;

an imaging apparatus; and one or more processors and/or circuitry configured to:

(1) execute first acquisition processing of acquiring a captured image of a real space captured by the imaging apparatus;

(2) execute second acquisition processing of acquiring a virtual image based on a position and attitude of the imaging apparatus, estimated using a first captured image;

(3) execute first correction processing of generating a first corrected image by correcting the virtual image, based on a first attitude, which is an attitude of the imaging apparatus at a first time point that is later than an imaging time point of the first captured image;

(4) execute composition processing of generating a first composite image by compositing a second captured image having been captured after the first captured image and the first corrected image;

(5) execute display control processing of controlling the display so as to display the first composite image; and (6) execute drawing processing of drawing the virtual image, based on a position and attitude of the imaging apparatus estimated using the first captured image, wherein at least one of (i) a frame rate of display by the display and (ii) a frame rate of imaging by the imaging apparatus is higher than a frame rate of drawing in the drawing processing.

20. The head-mounted display according to claim 19, wherein both (i) a frame rate of display by the display and (ii) a frame rate of imaging by the imaging apparatus are higher than a frame rate of drawing in the drawing processing.

* * * * *